(12) United States Patent
Mae et al.

(10) Patent No.: US 12,637,588 B2
(45) Date of Patent: May 26, 2026

(54) METHOD FOR PRODUCING INORGANIC PARTICLE-CONTAINING SLURRY AND ZIRCONIA PARTICLE-CONTAINING SLURRY

(71) Applicant: FUJIMI INCORPORATED, Kiyosu (JP)

(72) Inventors: Ryota Mae, Kiyosu (JP); Yuki Ozeki, Kiyosu (JP); Akane Kumayama, Kiyosu (JP); Masaki Tada, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 328 days.

(21) Appl. No.: 18/119,460

(22) Filed: Mar. 9, 2023

(65) Prior Publication Data

US 2023/0312981 A1      Oct. 5, 2023

(30) Foreign Application Priority Data

Mar. 29, 2022    (JP) ................................ 2022-053322
Sep. 13, 2022    (JP) ................................ 2022-145043

(51) Int. Cl.
*C09G 1/02*        (2006.01)
*B24B 37/04*      (2012.01)
*C09K 3/14*        (2006.01)

(52) U.S. Cl.
CPC .............. *C09G 1/02* (2013.01); *B24B 37/044* (2013.01); *C09K 3/1409* (2013.01)

(58) Field of Classification Search
None
See application file for complete search history.

(56) References Cited

U.S. PATENT DOCUMENTS

| | | | |
|---|---|---|---|
| 9,834,705 B2 | 12/2017 | Park | |
| 2005/0198912 A1* | 9/2005 | Kim | ...................... B24B 37/044 |
| | | | 51/307 |
| 2006/0213126 A1* | 9/2006 | Cho | ......................... C09G 1/02 |
| | | | 257/E21.244 |
| 2008/0131571 A1* | 6/2008 | Nakayama | .............. A23P 20/19 |
| | | | 426/531 |
| 2016/0251547 A1 | 9/2016 | Park | |
| 2019/0092973 A1 | 3/2019 | Penta et al. | |
| 2019/0276706 A1 | 9/2019 | Yoshizaki et al. | |

FOREIGN PATENT DOCUMENTS

| | | |
|---|---|---|
| JP | 2016-160435 A | 9/2016 |
| JP | 2019-070112 A | 5/2019 |
| JP | 2019-157121 A | 9/2019 |
| TW | 200535216 A | 11/2005 |
| TW | 200643130 A | 12/2006 |
| TW | 200838995 A | 10/2008 |

OTHER PUBLICATIONS

Notice of Reasons for Refusal on Japanese Appl. No. 2022-145043 dated Jan. 15, 2026 (with English translation, 6 pages).
Taiwanese Office Action on TW Application No. 112108228 dated Feb. 9, 2026 (with English Translation, 30 pages).

* cited by examiner

*Primary Examiner* — Stephanie P Duclair
(74) *Attorney, Agent, or Firm* — Foley & Lardner LLP

(57) ABSTRACT

The present invention provides a method for producing an inorganic particle-containing slurry, by which the number of coarse particles can be sufficiently reduced. The present invention is a method for producing an inorganic particle-containing slurry, which comprises: a step of preparing an inorganic particle dispersion containing inorganic particles and a dispersing medium, and having a pH less than the isoelectric point of the inorganic particles; and a step of adding an alkaline compound to the inorganic particle dispersion in such a manner that the pH does not reach the isoelectric point of the inorganic particles.

11 Claims, No Drawings

METHOD FOR PRODUCING INORGANIC PARTICLE-CONTAINING SLURRY AND ZIRCONIA PARTICLE-CONTAINING SLURRY

CROSS-REFERENCE TO RELATED APPLICATIONS

The entire disclosures of Japanese Patent Application Nos. 2022-053322 filed on Mar. 29, 2022 and 2022-145043 filed on Sep. 13, 2022 are incorporated herein by reference in their entireties.

BACKGROUND OF THE INVENTION

Field of the Invention

The present invention relates to a method for producing an inorganic particle-containing slurry and a zirconia particle-containing slurry.

Description of the Related Art

In recent years, with multi-layer wiring on a surface of a semiconductor substrate, namely a chemical mechanical polishing (CMP) technique is used for polishing and flattening semiconductor substrates upon production of devices. CMP is a method for flattening a surface of an object to be polished (polishing object) such as a semiconductor substrate with the use of a polishing composition (slurry) containing abrasive grains such as silica, alumina and ceria, an anticorrosive, a surfactant, etc., wherein examples of the object to be polished (polishing object) include wirings and plugs made of silicon, polysilicon, silicon oxide film (silicon oxide), silicon nitride and metal.

An example of the most frequently used polishing composition is a polishing composition containing silica (silicon oxide) particles as abrasive grains, such as fumed silica, and colloidal silica. A polishing liquid containing silica particles is characterized by its high versatility. Through appropriate selection of the content of abrasive grains, the pH of the polishing liquid, an additive, etc., a wide variety of material types can be polished regardless of insulating materials and conductive materials.

Moreover, as a polishing composition to be used for polishing silicon nitride substrates, metals such as tungsten, or organic films, a polishing composition containing zirconia particles as abrasive grains has also been developed (for example, see Japanese Patent Laid-Open No. 2016-160435 (corresponding to the specification of U.S. Patent Application Publication No. 2016/0251547)).

SUMMARY OF THE INVENTION

In recent years, a manufacturing process for semiconductor devices is required to achieve finer wiring and is problematic in polishing scratches and residues resulting from polishing. Specifically, if many coarse particles are present in a polishing composition, polishing scratches and residues tend to be formed in greater numbers on a surface of an object to be polished upon polishing. Accordingly, a polishing composition is required to contain the reduced number of coarse particles. However, the technology according to Japanese Patent Laid-Open No. 2016-160435 (corresponding to the specification of U.S. Patent Application Publication No. 2016/0251547) is problematic in that the number of coarse particles present in a composition is not sufficiently reduced.

Therefore, an object of the present invention is to provide a method for producing an inorganic particle-containing slurry, by which the number of coarse particles can be sufficiently reduced.

The present inventors have intensively studied in view of the above problems. As a result, the present inventors have discovered that the above problems are solved by a method for producing an inorganic particle-containing slurry, which comprises the steps of: preparing an inorganic particle dispersion containing inorganic particles and a dispersing medium and having a pH less than the isoelectric point of the inorganic particles; and adding an alkaline compound to the inorganic particle dispersion in such a manner that the pH does not reach the isoelectric point of the inorganic particles, and thus have completed the present invention.

DETAILED DESCRIPTION OF THE PREFERRED EMBODIMENTS

The present invention will be described as follows. Note that the present invention is not limited to only the following embodiments.

According to an embodiment of the present invention, a method for producing an inorganic particle-containing slurry is provided, which comprises the steps of: preparing an inorganic particle dispersion containing inorganic particles and a dispersing medium, and having a pH less than the isoelectric point of the inorganic particles; and adding an alkaline compound to the inorganic particle dispersion in such a manner that the pH does not reach the isoelectric point of the inorganic particles. According to such production method of the present invention, aggregation of inorganic particles can be suppressed, and thus an inorganic particle-containing slurry, in which the number of coarse particles (for example, the number of particles having a particle size of 1.01 μm or more) is sufficiently reduced, can be obtained. Further, a polishing composition containing the thus obtained inorganic particle-containing slurry contains the sufficiently reduced number of coarse particles (for example, the number of particles having a particle size of 1.01 μm or more), so as to be able to suppress the formation of defects (for example, residues, scratches, etc.) on the surface of an object to be polished after polishing.

Meanwhile, when a mixture is prepared by adding an inorganic particle dispersion to an alkaline compound or a mixture is prepared by adding an alkaline compound to an inorganic particle dispersion in such a manner that the pH reaches or exceeds the isoelectric point of the inorganic particles, inorganic particles aggregate and the number of coarse particles increases.

Hereinafter, the embodiments of the present invention are described in detail, but the present invention is not limited to only the following embodiments and can be modified variously within the scope of the claims. The embodiments described herein can be arbitrarily combined to form other embodiments. In this specification, unless otherwise specified, an operation and measurement of physical properties etc., are performed under conditions of room temperature (20° C. or higher and 25° C. or lower)/relative humidity of 40% RH or more and 50% RH or less.

[Step of Preparing Inorganic Particle Dispersion]

In this step, an inorganic particle dispersion containing inorganic particles and a dispersing medium, and having a pH less than the isoelectric point of the inorganic particles is prepared.

<Inorganic Particles>

Inorganic particles to be used in the present invention are not particularly limited, but have a positive zeta potential at a pH of preferably less than 6, more preferably less than 3. Specific examples of inorganic particles include preferably at least one selected from the group consisting of silica particles, zirconia particles, alumina particles, ceria particles, titania particles, and silicon carbide particles.

These inorganic particles that may also be used herein are commercial products or synthetic products. Further, the forms of these inorganic particles are not particularly limited, and the form thereof may be a particulate form containing no dispersing medium etc., the form of a dispersion, or the form of sol, gel, colloid, for example. Further specific examples of inorganic particles include silica sol, colloidal silica, fumed silica, zirconia sol, colloidal zirconia, fumed zirconia, alumina sol, colloidal alumina, fumed alumina, ceria sol, colloidal ceria, fumed ceria, titania sol, colloidal titania, and fumed titania.

The shape of inorganic particles is not particularly limited, and may be spherical or non-spherical. Specific examples of the non-spherical shape include various shapes such as a polygonal prism shape e.g., a triangular prism and a quadrangular prism, a cylindrical shape, a straw rice-bag shape having the column central portion bulging to a volume greater than that of the ends, a donut shape having a through-hole at the central portion of the disk, a plate, a so-called cocoon shape having a constriction in the central portion, a so-called associated type spherical shape in which a plurality of particles are integrated, a so-called konpeito shape having a plurality of protrusions on the surface, and a rugby ball shape, but are not particularly limited thereto.

Inorganic particles may be subjected to surface modification. Specific examples of such inorganic particles include particles subjected to surface modification by which the surface of colloidal silica is modified with a silane coupling agent.

Examples of a method for modifying the surface of colloidal silica with a silane coupling agent include the following immobilization method. For example, surface modification can be performed by the method described in "Sulfonic acid-functionalized silica through of thiol groups", Chem. Commun. 246-247 (2003). Specifically, a silane coupling agent having thiol groups such as 3-mercaptopropylmethoxysilane is coupled to colloidal silica, and then the thiol groups are oxidized with hydrogen peroxide, so that colloidal silica with sulfonic acid immobilized on the surface can be obtained.

Alternatively, for example, surface modification can also be performed by the method described in "Novel Silane Coupling Agents Containing a Photolabile 2-Nitrobenzyl Ester for Introduction of a Carboxy Group on the Surface of Silica Gel", Chemistry Letters, 3, 228-229 (2000). Specifically, a silane coupling agent containing a photolabile 2-nitrobenzyl ester is coupled to colloidal silica and then irradiated with light, so that colloidal silica with carboxylic acid immobilized on the surface can be obtained.

The above silica is colloidal silica having anionic groups (anionic modified colloidal silica), but colloidal silica having cationic groups (cationic modified colloidal silica) may also be used. Examples of the colloidal silica having cationic groups include colloidal silica with amino groups immobilized on the surface. Examples of a method for producing such colloidal silica having cationic groups include the method described in Japanese Patent Laid-Open No. 2005-162533, which involves immobilizing a silane coupling agent having amino groups, such as aminoethyl trimethoxysilane, aminopropyl trimethoxysilane, aminoethyl triethoxysilane, aminopropyl triethoxysilane, aminopropyldimethylethoxysilane, aminopropylmethyldiethoxysilane, and aminobutyltriethoxysilane, to the surface of colloidal silica. With the use of this method, colloidal silica (amino group-modified colloidal silica) with amino groups immobilized on the surface can be obtained.

Further, inorganic particles may be the one doped (solid solution) with an agent for stabilizing structure in order to stabilize and maintain the crystal structure. Specific examples of such inorganic particles include zirconia particles doped with yttrium or an oxide thereof, calcium oxide (CaO), or magnesium oxide (MgO).

Of these, inorganic particles having a positive zeta potential at a pH of less than 6 is preferable, and inorganic particles having a positive zeta potential at a pH of less than 3 is more preferable. Specifically, at least one selected from the group consisting of cationic modified silica particles (preferably cationic modified colloidal silica particles), zirconia particles (preferably colloidal zirconia particles), alumina particles, ceria particles, and titania particles is preferable.

The size of inorganic particles in an inorganic particle dispersion is not particularly limited. For example, when inorganic particles are spherical, the average primary particle size of inorganic particles is preferably 5 nm or more, more preferably 10 nm or more, and further preferably nm or more. Further, the average primary particle size of inorganic particles is preferably 120 nm or less, more preferably 80 nm or less, and further preferably 50 nm or less. Specifically, the average primary particle size of inorganic particles is preferably 5 nm or more and 120 nm or less, more preferably 10 nm or more and 80 nm or less, and further preferably 15 nm or more and 50 nm or less. Note that in the specification, the average primary particle size of inorganic particles can be calculated on the assumption that the shape of inorganic particles is spherical (high sphericity ball) based on the specific surface area (SA) of inorganic particles calculated by the BET method, for example.

Further, the average secondary particle size of inorganic particles in an inorganic particle dispersion is preferably 20 nm or more, more preferably 30 nm or more, and further preferably 35 nm or more. Moreover, the average secondary particle size of inorganic particles is preferably 250 nm or less, more preferably 200 nm or less, and further preferably 150 nm or less. Specifically, the average secondary particle size of inorganic particles is preferably nm or more and 250 nm or less, more preferably 30 nm or more and 200 nm or less, and further preferably 35 nm or more and 150 nm or less. Note that in the specification, the average secondary particle size of inorganic particles corresponds to the particle diameter D50 (hereinafter, also simply referred to as "D50") when the accumulated volume of particles from the particulate side reaches 50% of the total volume of all the particles in the particle size distribution found by the laser diffraction/scattering method. Specifically, a value to be employed as the average secondary particle size of inorganic particles is measured by the method described in Examples.

[Dispersing Medium]

Examples of a dispersing medium to be used in the step can include water; alcohols such as methanol, ethanol, and ethylene glycol; ketones such as acetone, and mixtures thereof. Of these, water is preferable as the dispersing medium. Specifically, according to a preferred embodiment of the present invention, the dispersing medium contains water. According to a more preferred embodiment of the present invention, the dispersing medium is substantially composed of water. Note that the above "substantially" is intended to mean that a dispersing medium other than water can be contained as long as the purpose and the effects of the present invention can be achieved. More specifically, the dispersing medium is composed of preferably 90 mass % or more and 100 mass % or less of water and 0 mass % or more and mass % or less of a dispersing medium other than water, and more preferably 99 mass % or more and 100 mass % or less of water and 0 mass % or more and 1 mass % or less of a dispersing medium other than water. Most preferably, the dispersing medium is water.

Water containing impurities in an amount as low as possible is preferable as the dispersing medium from the viewpoint of not inhibiting the action of components contained in the polishing composition. Specifically, pure water or ultrapure water, which is obtained by removing foreign matter through a filter after removal of impurity ions using an ion exchange resin, or distilled water is more preferable.

In this step, the inorganic particle dispersion is prepared in such a manner that the solution has a pH less than the above isoelectric point of inorganic particles. The pH of the inorganic particle dispersion is not particularly limited, as long as the solution has a pH that is less than the isoelectric point of inorganic particles, but a difference between the isoelectric point of inorganic particles and the pH of the inorganic particle dispersion (the isoelectric point of inorganic particles—the pH of the inorganic particle dispersion) is preferably 1.0 or more, more preferably 2.0 or more, and further preferably 3.0 or more.

Through preparation of a dispersion with such a pH, aggregation of inorganic particles takes place with difficulty, good dispersibility is maintained, and the number of coarse particles (for example, the number of particles having a particle size of 1.01 μm or more) in the finally obtained inorganic particle-containing slurry can be sufficiently reduced.

The pH of the isoelectric point of inorganic particles is not particularly limited, and is preferably 3.0 or more, more preferably 4.5 or more, further preferably 6.0 or more, and even more preferably 7.0 or more. Note that the pH of the isoelectric point of inorganic particles can be found by preparing zeta potential measuring solutions having pHs in the range of 3.0 or more and 10.0 or less (1.0 increments), measuring the zeta potential of inorganic particles, and then calculating by the following formula with the use of a pH before and a pH after the change of the sign of the zeta potential and zeta potentials at the pH before and the pH after the change, respectively.

$$\text{pH of isoelectric point} = \frac{\alpha \times \zeta_\beta - \beta \times \zeta_\alpha}{\zeta_\beta - \zeta_\alpha} \qquad \text{[Formula 1]}$$

$\alpha$ and $\beta$: the pH value before and the pH value after the change of the sign of the zeta potential ($\alpha < \beta$)

$\zeta_\alpha$: zeta potential at pH value $\alpha$ $\zeta_\beta$: zeta potential at pH value $\beta$ Here, pH can be measured using a pH meter (model: F-71 manufactured by HORIBA, Ltd.). Further, a zeta potential can be measured using a zeta potential measuring apparatus (trade name "Zetasizer nano ZSP" manufactured by Malvern Instruments).

<pH Adjusting Agent>

When the pH less than the isoelectric point of inorganic particles cannot be obtained only by mixing the above inorganic particles and dispersing medium, a pH adjusting agent may further be added in this step.

The pH adjusting agent is not particularly limited, as long as it is a compound having a pH-adjusting function, and a known compound can be used herein. The pH adjusting agent is not particularly limited, as long as it has a pH-adjusting function and examples thereof include acid and alkali.

Either an inorganic acid or an organic acid can be used as an acid. Examples of an inorganic acid include, but are not particularly limited to, sulfuric acid, nitric acid, boric acid, carbonic acid, hypophosphorous acid, phosphorous acid, and phosphoric acid. Examples of an organic acid include, but are not particularly limited to, carboxylic acids such as 1-hydroxyethylidene-1,1-diphosphonic acid (HEDP), formic acid, acetic acid, propionic acid, butyric acid, valeric acid, 2-methyl butyric acid, n-hexanoic acid, 3,3-dimethyl-butyric acid, 2-ethylbutyric acid, 4-methylpentanoic acid, n-heptanoic acid, 2-methylhexanoic acid, n-octanoic acid, 2-ethyl hexoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, and lactic acid, as well as methanesulfonic acid, ethanesulfonic acid, and isethionic acid.

Examples of alkali include, but are not particularly limited to, hydroxides of alkali metals such as sodium hydroxide, and potassium hydroxide, quaternary ammonium salts such as ammonia, tetramethyl ammonium hydroxide, and tetraethyl ammonium hydroxide, and amines such as ethylenediamine and piperazine. Of these, potassium hydroxide and ammonia are preferable.

These pH adjusting agents may be used singly or in combination of two or more thereof.

The concentration (content) of a pH adjusting agent is not particularly limited, and may be the concentration at which the pH value can be a value less than the above isoelectric point of inorganic particles.

A method for preparing an inorganic particle dispersion is not particularly limited, and an inorganic particle dispersion may be prepared by mixing and stirring inorganic particles, a dispersing medium (preferably, water), and a pH adjusting agent to be added as needed. At this time, the order of mixing these components one by one is not particularly limited. For example, an inorganic particle dispersion is prepared by adding inorganic particles to a dispersing medium, mixing and stirring the resultant, and then adding a pH adjusting agent as needed in such a manner that the pH is a desired value. The temperature for mixing and stirring each of these components is not particularly limited, and is preferably 10° C. or higher and 40° C. or lower, and heating may also be performed to increase the rate of dissolution. Further, the time for mixing is also not particularly limited.

The concentration (content) of inorganic particles in the inorganic particle dispersion obtained in this step is not particularly limited, but is preferably 0.1 mass % or more, and more preferably 0.5 mass % or more. Further, the concentration (content) of inorganic particles in the inorganic particle dispersion is preferably 10 mass % or less, and more preferably 5 mass % or less. Specifically, the concentration (content) of inorganic particles in the inorganic particle dispersion is preferably 0.1 mass % or more and 10 mass % or less, and is more preferably 0.5 mass % or more and 5 mass % or less.

[Step of Adding Alkaline Compound]

In this step, to the above-obtained inorganic particle dispersion, an alkaline compound is added in such a manner that the pH does not reach the isoelectric point of inorganic particles. Here, "in such a manner that the pH does not reach the isoelectric point of inorganic particles" means that an alkaline compound is added in such a manner that the pH is maintained at a pH less than the isoelectric point of inorganic particles.

Specific examples of an alkaline compound include, but are not particularly limited to, alkyl amine oxides such as N-lauryl-N, N-dimethyl amine oxide (lauryl dimethyl amine oxide), N-myristyl-N,N-dimethyl amine oxide, N-lauroyl aminopropyl-N,N-dimethyl amine oxide, and N-myristyloyl aminopropyl-N,N-dimethyl amine oxide; ammonia; quaternary ammonium salts such as trimethyl benzyl ammonium chloride, tetrabutyl ammonium chloride, tetramethyl ammonium chloride, triethyl benzyl ammonium chloride, trioctyl-methyl ammonium chloride, tetramethyl ammonium hydroxide, and tetraethyl ammonium hydroxide; hydroxides of alkali metals such as sodium hydroxide and potassium hydroxide; carbonates such as ammonium carbonate, potassium carbonate, calcium carbonate, sodium carbonate, barium carbonate, magnesium carbonate, and lithium carbonate; nitrogen-containing heterocyclic compounds such as aziridine, pyridine, pyrimidine, pyrrolidine, piperazine, piperidine, pyrazine, triazine, imidazole, indole, quinoline, iso-quinoline, benzo-isoquinoline, thiazoline, isothiazoline, isothiazolinone, guanidine, purine, pteridine, triazole, triazolidine, benzotriazole, carboxy benzotriazole, or a derivative having the skeleton thereof; basic amino acids such as lysine, arginine, and histidine.

These alkaline compounds may be used singly or in combination of two or more thereof. Further, the alkaline compound that may be used herein is a commercial product or synthetic product.

Specific examples of a preferable alkaline compound include at least one selected from the group consisting of ammonia, a nitrogen-containing heterocyclic compound having an isothiazolinone skeleton, tetraethyl ammonium hydroxide, potassium hydroxide, and arginine. Specific examples of a more preferable alkaline compound include at least one selected from the group consisting of ammonia, 1,2-benzisothiazol-3(2H)-one (BIT), tetraethyl ammonium hydroxide, potassium hydroxide, and arginine.

The form of an alkaline compound to be added is not particularly limited and may be any of powdery, granular, liquid, and aqueous solution forms. However, an aqueous solution form is preferable from the viewpoint of efficiently mixing such an alkaline compound in an inorganic particle dispersion. Hereinafter, a case in which an alkaline compound is in an aqueous solution form is described in detail.

When an aqueous solution containing an alkaline compound (hereinafter, may also be referred to as an aqueous alkaline solution) is used, the pH of the aqueous solution is not particularly limited and is preferably 7.0 or more and 13.0 or less, and more preferably 9.0 or more and 11.0 or less. The concentration (content) of an alkaline compound in an aqueous alkaline solution is not particularly limited, as long as the volume satisfies the above preferred pH range.

When an aqueous alkaline solution is added to an inorganic particle dispersion, the solution is preferably added while stirring the inorganic particle dispersion. The rate (speed) of adding an aqueous alkaline solution is not particularly limited, as long as the rate does not cause the pH of the resultant to reach the isoelectric point of inorganic particles. In addition, an aqueous alkaline solution may also be added while tracking the pH of an inorganic particle dispersion using a pH meter etc.

The temperature at which an aqueous alkaline solution is added is not particularly limited, and is preferably 10° C. or higher and 40° C. or lower, and heating may also be performed to quickly perform mixing. Furthermore, the time for mixing after addition of an aqueous alkaline solution is also not particularly limited.

A mixture is obtained by such a production method, wherein the number of coarse particles (for example, the number particles having a particle size of 1.01 μm or more) is reduced, and thus the mixture can be directly used as an inorganic particle-containing slurry for each application.

[Step of Filtering Inorganic Particle-Containing Slurry]

As described above, the mixture obtained after the step of adding an alkaline compound contains the reduced number of coarse particles, and thus can be directly used as an inorganic particle-containing slurry for each application. However, the production method of the present invention may further comprise a step of filtering the obtained mixture after the above step of adding an alkaline compound. This step is performed, so that the number of coarse particles in the finally obtained inorganic particle-containing slurry (for example, the number of particles having a particle size of 1.01 μm or more) can be further reduced.

The shape of a filter medium to be used in this step is not particularly limited, and filters having various structures, shapes, and functions can be employed as appropriate. Specific examples of filters that are preferably employed include those excellent in filterability such as a pleated type and a depth type filters, a depth-pleated type filter, a membrane type filter, and an adsorption type filter. The structure of a filter is not particularly limited and may be a sac-shaped bag type or a hollow cylindrical cartridge type. The cartridge-type filter may be a gasket type filter or an O-ring type filter. Filtering conditions (for example, filtration differential pressure, filtering speed) may also be set as appropriate based on the technical common sense in this field in view of target quality, production efficiency, etc.

The size of filter openings (pore size) is preferably 0.05 μm or more, more preferably 0.1 μm or more, and further preferably 0.15 μm or more from the viewpoint of improving yields. Moreover, from the viewpoint of increasing the effect of removing foreign matter and aggregates, the size of filter openings (pore size) is preferably 5.0 μm or less, more preferably 3.0 μm or less, and further preferably less than 1.0 μm. The material of a filter is not particularly limited, and examples thereof include cellulose, nylon, polysulfone, polyethersulfone, polypropylene, polytetrafluoroethylene (PTFE), polycarbonate, and glass.

A filtration method is also not particularly limited, and for example, natural filtration that is performed under atmospheric pressure and other known filtration methods including vacuum filtration, pressure filtration, and centrifugal filtration etc., can be employed as appropriate.

A commercial product can be used as a filter. Examples of a commercially available filter include HC series, BO series, SLF series, SRL series, MPX series filters, etc., (manufactured by ROKI TECHNO CO., LTD.) provided with polypropylene nonwoven fabric as a filter medium.

The inorganic particle-containing slurry according to the present invention preferably contains a dispersing agent. Here, the dispersing agent is not particularly limited, and can be selected appropriately depending on the desired applications and purposes. Examples of the type of a dispersing agent include malic acid, malonic acid, polyacrylic acid, polyvinyl alcohol, and sugar alcohol. Among these dispersing agents, from the viewpoint of the dispersibility of inorganic particles after storage (particularly, the dispersibility of zirconia particles), a sugar alcohol is preferable. The timing for adding a dispersing agent is not particularly limited.

The surface of inorganic particles (particularly, zirconia particles) is usually hydrophobic and such inorganic particles tend to aggregate with each other. When inorganic particles (particularly, zirconia particles) are mixed with a sugar alcohol, the hydrophobic groups of the sugar alcohol (hydrocarbon radical) adhere to the hydrophobic surface of inorganic particles (particularly, zirconia particles) to cause the hydroxyl groups of the sugar alcohol to be oriented to the outside of zirconia particles, and thus the surface of zirconia particles is hydrophilized. Through the hydrophilization, inorganic particles (particularly, zirconia particles) will be easily mixed with a dispersing medium (particularly, water), and thus can exist independently as particles. Further, the sugar alcohol adheres to the surface of inorganic particles (particularly, zirconia particles), causing steric hindrance, and thus the aggregation of inorganic particles (particularly, zirconia particles) with each other can be suppressed. Note that the above mechanism of improving the dispersibility of inorganic particles (particularly, zirconia particles) is an assumption, and the present invention is not limited to the above assumption.

Specifically, in an embodiment of the present invention, the inorganic particle-containing slurry further contains a sugar alcohol.

The sugar alcohol is not particularly limited, but preferably has 3 or more hydroxy groups in the molecule. Specific examples thereof include pentaerythritol, dipentaerythritol, sorbitan, adonitol, maltitol, threitol, erythritol, arabinitol, ribitol, xylitol, iditol, sorbitol, mannitol, lactitol, galactitol, dulcitol, talitol, allitol, perseitol, volemitol, D-erythro-L-galaoctitol, D-erythro-L-talooctitol, erythromannooctitol, D-threo-L-galaoctitol, D-arabo-D-mannononitol, D-gluco-D-galadecitol, bornesitol, conduritol, inositol, ononitol, pinitol, pinpollitol, quebrachitol, valienol, and viscumitol. Of these, sugar alcohols having straight-chain structures are more preferable. Specifically, xylitol, sorbitol, adonitol, threitol, erythritol, arabinitol, ribitol, iditol, mannitol, galactitol, talitol, allitol, and perseitol are preferable, xylitol and sorbitol are more preferable, and sorbitol is further preferable. These sugar alcohols can be used singly or in combination of two or more thereof.

The molecular weight of a sugar alcohol is not particularly limited, and is preferably 80 or more, more preferably 100 or more, and further preferably 120 or more. Further, the molecular weight of a sugar alcohol is not particularly limited, and is preferably less than 1,000, more preferably 600 or less, and further preferably 400 or less. Specifically, the molecular weight of a sugar alcohol is preferably 80 or more and less than 1,000, more preferably 100 or more and 600 or less, further preferably 120 or more and 400 or less, and most preferably 200 or less.

The concentration (content) of a dispersing agent (particularly, sugar alcohol) when the inorganic particle-containing slurry according to the present invention further contains a dispersing agent (particularly, sugar alcohol) is not particularly limited, and can be appropriately selected depending on the desired applications and purposes. For example, the concentration (content) of a dispersing agent (particularly, sugar alcohol) is, for example, 0.001 mass % (10 ppm)

or more, preferably 0.005 mass % (50 ppm) or more, more preferably more than 0.005 mass % (50 ppm), and further preferably 0.008 mass % (80 ppm) or more with respect to the total mass of the inorganic particle-containing slurry. Moreover, the upper limit of the concentration (content) of a dispersing agent (particularly, sugar alcohol) in the inorganic particle-containing slurry is, for example, 30 mass % or less, preferably 3 mass % or less, more preferably 0.5 mass % (5,000 ppm) or less, further preferably 0.1 mass % (1,000 ppm) or less, and particularly preferably 0.05 mass % (500 ppm) or less with respect to the total mass of the inorganic particle-containing slurry. Specifically, the concentration (content) of a dispersing agent (particularly, sugar alcohol) is, for example, 0.001 mass % or more and 30 mass % or less, preferably 0.005 mass % or more and 3 mass % or less, more preferably more than 0.005 mass % and 0.5 mass % or less, and further preferably 0.008 mass % or more and 0.1 mass % or less, and particularly preferably 0.008 mass % or more and 0.05 mass % or less with respect to the total mass of the inorganic particle-containing slurry. If the content of a dispersing agent is within such a range, good dispersibility can be maintained even after the long-term storage of abrasive grains (particularly, zirconia particles).

The inorganic particle-containing slurry obtained by the production method comprising each of the above steps contains few coarse particles. For example, in the inorganic particle-containing slurry, the number of particles having a particle size of 1.01 μm or more as measured with an in-liquid particle counter is usually 10,000 particles/mL or less, preferably 7,000 particles/mL or less, more preferably 5,000 particles/mL or less, and further more preferably 3,000 particles/mL or less.

Further, for example, in the inorganic particle-containing slurry, the number of particles having a particle size of 1.98 μm or more as measured with an in-liquid particle counter is usually 3,000 particles/mL or less, preferably 1,000 particles/mL or less, more preferably 600 particles/mL or less, further preferably 400 particles/mL or less, further more preferably 300 particles/mL or less, and particularly preferably 250 particles/mL or less. For example, in the inorganic particle-containing slurry, the number of particles having a particle size of 3.03 μm or more as measured with an in-liquid particle counter is preferably 1,000 particles/mL or less, more preferably 700 particles/mL or less, further preferably 400 particles/mL or less, even more preferably 300 particles/mL or less, particularly preferably 100 particles/mL or less, and most preferably 30 particles/mL or less.

The above number of particles can be specifically measured by the method described in Examples.

The size of inorganic particles in the finally obtained inorganic particle-containing slurry is not particularly limited. For example, when inorganic particles are spherical, the average primary particle size of the inorganic particles is preferably 5 nm or more, more preferably 10 nm or more, and further preferably 15 nm or more. Further, the average primary particle size of the inorganic particles is preferably 120 nm or less, more preferably 80 nm or less, and further preferably 50 nm or less. Specifically, the average primary particle size of the inorganic particles is preferably 5 nm or more and 120 nm or less, more preferably nm or more and 80 nm or less, and further preferably 15 nm or more and 50 nm or less.

The average secondary particle size of inorganic particles in the finally obtained inorganic particle-containing slurry is preferably 20 nm or more and 250 nm or less, more preferably 30 nm or more and 200 nm or less, further preferably 35 nm or more and 150 nm or less, and even more preferably 40 nm or more and 140 nm or less. If the particle size of inorganic particles is 20 nm or more, the resulting polishing speed is sufficient when the slurry is used for a polishing composition. If the particle size of inorganic particles is 250 nm or less, scratches (slight cuts) made on a surface of an object to be polished or residues on the surface of an object to be polished can be reduced when the slurry is used for a polishing composition. Note that in the specification, the particle size of inorganic particles refers to the particle diameter (D50, hereinafter, may also be simply referred to as "D50") when the volume of accumulated particles from the particulate side reaches 50% of the total volume of the particles in the particle size distribution as found by the laser diffraction/scattering method. More specifically, a value to be employed as D50 of inorganic particles is measured by the method described in Examples.

The concentration (content) of inorganic particles in the finally obtained inorganic particle-containing slurry is not particularly limited, but is preferably 0.01 mass % or more, more preferably 0.05 mass % or more, even more preferably 0.08 mass % or more, and particularly preferably more than 0.1 mass % with respect to the total mass of the inorganic particle-containing slurry. Moreover, the upper limit of the concentration (content) of inorganic particles in the inorganic particle-containing slurry is preferably mass % or less, more preferably 25 mass % or less, further preferably 20 mass % or less, even more preferably 10 mass % or less, and particularly preferably less than 10 mass % with respect to the total mass of the inorganic particle-containing slurry. Specifically, the concentration (content) of inorganic particles in the inorganic particle-containing slurry is preferably 0.01 mass % or more and 30 mass % or less, more preferably 0.05 mass % or more and 25 mass % or less, further preferably 0.08 mass % or more and 20 mass % or less, even more preferably 0.08 mass % or more and 10 mass % or less, and particularly preferably more than 0.1 mass % and less than 10 mass % with respect to the total mass of the inorganic particle-containing slurry.

The zeta potential ($\zeta$ electric potential) of inorganic particles in the finally obtained inorganic particle-containing slurry is preferably positive. Specifically, the lower limit of the zeta potential ($\zeta$ electric potential) of inorganic particles is preferably 10 mV or more, more preferably 15 mV or more, further preferably mV or more, and particularly preferably 25 mV or more. Further the upper limit of the zeta potential ($\zeta$ electric potential) of inorganic particles is not particularly limited and is preferably 70 mV or less, more preferably 65 mV or less, further preferably 50 mV or less, and particularly preferably less than 40 mV. Specifically, the zeta potential ($\zeta$ electric potential) of inorganic particles in the inorganic particle-containing slurry is preferably 10 mV or more and 70 mV or less, more preferably 15 mV or more and 65 mV or less, further preferably 20 mV or more and 50 mV or less, and particularly preferably 25 mV or more and less than 40 mV.

The pH of the finally obtained inorganic particle-containing slurry is not particularly limited, and usually 1.0 or more and 8.0 or less, and preferably 3.0 or more and 6.0 or less.

[Application]

An inorganic particle-containing slurry that is obtained by the production method according to the present invention is suitably used for a polishing composition, and particularly suitably used as a polishing composition for a semiconductor substrate, in which inorganic particles are used as abrasive grains.

The above-described production method according to the present invention is particularly appropriate for producing a zirconia-containing slurry to be mainly used for a polishing composition. The thus obtained zirconia particle-containing slurry contains very few coarse particles (for example, the number of particles having a particle size of 1.01 µm or more). Further, the polishing composition that is obtained with the use of the slurry also contains the reduced number of coarse particles, so as to be able to reduce defects (for example, residues, scratches, etc.) on a surface of the polished object to be polished obtained after polishing performed using the polishing composition. Hereinafter, the zirconia particle-containing slurry and a polishing composition containing the same, as well as a polishing method using the polishing composition are as described below.

[Zirconia Particle-Containing Slurry]

<Zirconia Particles>

The zirconia particle-containing slurry according to the present invention contains zirconia particles. Zirconia particles may be used singly or in combination of two or more thereof. Moreover, zirconia particles that may be used herein are commercial products or synthetic products.

Note that zirconia usually contains an inevitable impurity, hafnia ($HfO_2$). In the specification, numerical values related to composition such as contents are numerical values calculated considering an inevitable impurity, hafnia ($HfO_2$) as zirconia ($ZrO_2$).

Zirconia particles may also be zirconia sol particles, colloidal zirconia particles, or fumed zirconia particles, but are preferably colloidal zirconia particles. Further, zirconia particles may be undoped, or, for stabilization of the crystal structure, zirconia particles may be doped (solid solution) with an agent for stabilizing structure such as yttrium (Y) or an oxide thereof, a calcium oxide, or a magnesium oxide, for example. In addition, the crystal structure of zirconia particles is not particularly limited, and may be any of monoclinic crystal, tetragon, cubic crystal, or a form in which these are mixed at an arbitrary ratio.

The shape of zirconia particles is not particularly limited, and may be spherical or non-spherical. Specific examples of a non-spherical shape include, but are not particularly limited to, various shapes such as a polygonal prism shape e.g., a triangular prism and a quadrangular prism, a cylindrical shape, a straw rice-bag shape having the column central portion bulging to a volume greater than that of the ends, a donut shape having a through-hole at the central portion of the disk, a plate, a so-called cocoon shape having a constriction in the central portion, a so-called associated type spherical shape in which a plurality of particles are integrated, a so-called konpeito shape having a plurality of protrusions on the surface, a bar shape, a diamond shape, an angular shape and a rugby ball shape.

Zirconia particles are aggregates containing primary particles and/or secondary particles. An aggregate can be formed of a combination of individual particles. While these individual particles are known as primary particles in this technical field, combinations formed of aggregated particles are known as secondary particles in this technical field. Zirconia particles in a polishing composition can be in the form of primary particles, or the form of secondary particles that are aggregates of primary particles. Alternatively, zirconia particles can exist in both forms, primary particles and secondary particles. In a preferred embodiment, zirconia particles exist at least partially in the form of secondary particles in a polishing composition.

The size of zirconia particles contained in the zirconia particle-containing slurry is not particularly limited. For example, when zirconia particles are spherical, the average primary particle size of the zirconia particles is preferably 5 nm or more, more preferably 10 nm or more, and further preferably 15 nm or more. Further, the average primary particle size of the zirconia particles is preferably 120 nm or less, more preferably 80 nm or less, and further preferably 50 nm or less. Specifically, the average primary particle size of the zirconia particles is preferably 5 nm or more and 120 nm or less, more preferably 10 nm or more and 80 nm or less, and further preferably 15 nm or more and 50 nm or less.

The average secondary particle size of zirconia particles contained in the zirconia particle-containing slurry is preferably 20 nm or more and 250 nm or less, more preferably 30 nm or more and 200 nm or less, further preferably nm or more and 150 nm or less, and even more preferably nm or more and 140 nm or less. If the particle size of zirconia particles is 20 nm or more, the resulting polishing speed is sufficient when the slurry is used for a polishing composition. If the particle size of zirconia particles is 250 nm or less, scratches (slight cuts) made on a surface of an object to be polished and residues formed on the surface of the object to be polished can be suppressed when the slurry is used for a polishing composition.

The concentration (content) of zirconia particles in the zirconia particle-containing slurry is not particularly limited, but is preferably 0.01 mass % or more, more preferably 0.05 mass % or more, even more preferably 0.08 mass % or more, and particularly preferably more than 0.1 mass % with respect to the total mass of the zirconia particle-containing slurry. Further, the upper limit of the concentration (content) of zirconia particles in the zirconia particle-containing slurry is preferably 30 mass % or less, more preferably 25 mass % or less, further preferably mass % or less, even more preferably 10 mass % or less, and particularly preferably less than 10 mass % with respect to the total mass of the zirconia particle-containing slurry. Specifically, the concentration (content) of zirconia particles in the zirconia particle-containing slurry is preferably 0.01 mass % or more and 30 mass % or less, more preferably 0.05 mass % or more and 25 mass % or less, further preferably 0.08 mass % or more and 20 mass % or less, even more preferably 0.08 mass % or more and 10 mass % or less, and particularly preferably more than 0.1 mass % and less than mass % with respect to the total mass of the zirconia particle-containing slurry.

The zeta potential ($\zeta$ electric potential) of zirconia particles in the zirconia particle-containing slurry is preferably positive. Specifically, the lower limit of the zeta potential ($\zeta$ electric potential) of zirconia particles is preferably 10 mV or more, more preferably 15 mV or more, further preferably 20 mV or more, and particularly preferably mV or more. Moreover, the upper limit of the zeta potential ($\zeta$ electric potential) of zirconia particles is not particularly limited, but is preferably 70 mV or less, more preferably 65 mV or less, further preferably 50 mV or less, and particularly preferably less than 40 mV. Specifically, the zeta potential ($\zeta$ electric potential) of zirconia particles in the zirconia particle-containing slurry is preferably 10 mV or more and 70 mV or less, more preferably 15 mV or more and 65 mV or less, further preferably mV or more and 50 mV or less, and particularly preferably mV or more and less than 40 mV.

A value to be employed herein as the zeta potential of zirconia particles is measured by the method same as that employed for the above zeta potential of inorganic particles. The zeta potential of zirconia particles can be adjusted with the crystal structure of zirconia particles, the pH of a polishing composition, etc.

<Dispersing Medium>

A dispersing medium contained in the zirconia particle-containing slurry is the same as the one described for the inorganic particle-containing slurry, and thus here the description therefor is omitted. Further, other additives that can be contained in the zirconia particle-containing slurry are the same as those in the contents described in the above article of the inorganic particle-containing slurry, and thus here the description therefor is omitted.

The pH of the zirconia particle-containing slurry is not particularly limited, and is usually 2.0 or more and 8.0 or less, and preferably 3.0 or more and 6.0 or less.

The zirconia particle-containing slurry contains few coarse particles. Therefore, according to another embodiment of the present invention, the zirconia particle-containing slurry, in which the number of particles having a particle size of 1.01 $\mu$m or more as measured with an in-liquid particle counter is 10,000 particles/mL or less, is provided.

In the zirconia particle-containing slurry, the number of particles having a particle size of 1.01 $\mu$m or more as measured with an in-liquid particle counter is usually 10,000 particles/mL or less, preferably 7,000 particles/mL or less, more preferably 5,000 particles/mL or less, and further preferably 3,000 particles/mL or less.

Further, for example, in the zirconia particle-containing slurry, the number of particles having a particle size of 1.98 $\mu$m or more as measured with an in-liquid particle counter is usually 3,000 particles/mL or less, preferably 1,000 particles/mL or less, more preferably 600 particles/mL or less, further preferably 400 particles/mL or less, even more preferably 300 particles/mL or less, and particularly preferably 250 particles/mL or less. For example, in the zirconia particle-containing slurry, the number of particles having a particle size of 3.03 $\mu$m or more as measured with an in-liquid particle counter is usually 1,000 particles/mL or less, preferably 700 particles/mL or less, more preferably 400 particles/mL or less, further preferably 300 particles/mL or less, particularly preferably 100 particles/mL or less, and most preferably 30 particles/mL or less.

The zirconia particle-containing slurry according to the present invention may further contain a dispersing agent that can suppress the aggregation of inorganic particles, such as malic acid, malonic acid, polyacrylic acid, a polyvinyl alcohol, and a sugar alcohol described above. Of these dispersing agents, a sugar alcohol is preferable. Specifically, in an embodiment of the present invention, the zirconia-containing slurry further contains a sugar alcohol.

The type and preferred molecular weight of a sugar alcohol, the preferred concentration (content) range of a dispersing agent (particularly, sugar alcohol) in the zirconia particle-containing slurry, and the like are the same as those in the contents described for the above inorganic particle-containing slurry, and thus the description is omitted.

[Polishing Composition]

The polishing composition according to an embodiment of the present invention contains the above zirconia particle-containing slurry. In other words, the polishing composition according to an embodiment of the present invention contains zirconia particles, a dispersing medium, and another additive (s) to be added as needed. The polishing composition according to the present invention contains few coarse particles (for example, the number of particles having a particle size of 1.01 $\mu$m or more), so as to be able to reduce defects (for example, residues, scratches, etc.,) on a surface of a polished object to be polished obtained after polishing. Moreover, an object to be polished containing at least one of silicon nitride and a carbon-containing material can be polished at a higher polishing speed.

The polishing composition according to the present invention is supplied typically in the form of polishing liquid containing a polishing composition to an object to be polished, and then used for polishing the object to be polished. The polishing composition according to the present invention may be diluted (typically, diluted with water) and then used as a polishing liquid, for example, or may be directly used as a polishing liquid. Specifically, the concept of the polishing composition according to the present invention includes both a polishing composition (working slurry) to be supplied to an object to be polished and then used for polishing the object to be polished, and a concentrate (the stock solution of a working slurry) prepared by dilution for use in polishing. The concentration ratio of the concentrate can be, for example, on the basis of volume, about 2 or more folds and 100 or less folds, and is usually appropriately 1.5 or more folds and 20 or less folds, 1.5 or more folds and 10 or less folds, 2 or more folds and 10 or less folds, or 2 or more folds and 5 or less folds.

<Object to be Polished 22

The object to be polished according to the present invention preferably contains at least one of silicon nitride ($Si_3N_4$) and a carbon-containing material. The polishing composition according to the present invention exhibits particularly effective effect for the application.

Examples of a carbon-containing material include, but are not particularly limited to, amorphous carbon (amorphous carbon), spin-on carbon (SOC), diamond-like carbon (DLC), nanocrystal diamond, graphene; a low dielectric constant (Low-k) material, SiOC (carbon-containing silicon oxide, in which $SiO_2$ is doped with C), and silicon carbide. Of these, amorphous carbon, spin-on carbon, diamond-like carbon, or SiOC is preferable.

A film containing a carbon-containing material can be formed by CVD, PVD, a spin coating method, or the like.

The object to be polished according to the present invention may further contain other materials other than a carbon-containing material. Examples of other materials include a material containing nitrogen other than silicon nitride, silicon oxide, single crystal silicon, polycrystal silicon (polysilicon), amorphous silicon (amorphous silicon), n-type or p-type impurity-doped polycrystal silicon, n-type or p-type impurity-doped amorphous silicon, metal element, and SiGe.

Examples of a nitrogen-containing material include tantalum nitride (TaN) and titanium nitride (TiN).

Examples of an object to be polished containing silicon oxide include those generated using tetraethyl orthosilicate as a precursor, a TEOS (Tetraethyl Orthosilicate)-type silicon oxide film (hereinafter may also be referred to as a "TEOS" or "TEOS film"), an HDP (High Density Plasma) film, an USG (Undoped Silicate Glass) film, a PSG (Phosphorus Silicate Glass) film, a BPSG (Boron-Phospho Silicate Glass) film, and an RTO (Rapid Thermal Oxidation) film.

Examples of a metal element include tungsten, copper, cobalt, hafnium, nickel, gold, silver, platinum, palladium, rhodium, ruthenium, iridium, and osmium.

A commercial product may be used as an object to be polished or an object to be polished may be produced by a known method.

<Zirconia Particles>

Zirconia particles contained in the polishing composition according to the present invention have an effect of mechanically polishing an object to be polished. Details on zirconia particles (crystal structure, agent for stabilizing structure, particle size, zeta potential, etc.) are as described in the article of the above zirconia particle-containing slurry, and the description is omitted herein.

The concentration (content) of zirconia particles in a polishing composition is not particularly limited. In the case of a polishing composition (typically, a polishing liquid in the form of slurry, and may also be referred to as a working slurry or a polishing slurry) that is directly used as a polishing liquid for polishing an object to be polished, the lower limit of the content of zirconia particles in the polishing composition is preferably 0.01 mass % or more, more preferably 0.05 mass % or more, even more preferably 0.08 mass % or more, and particularly preferably more than 0.1 mass % with respect to the total mass of the polishing composition. Further, the upper limit of the concentration (content) of zirconia particles in the polishing composition is preferably 10 mass % or less, more preferably 5 mass % or less, further preferably 4 mass % or less, even more preferably 1 mass % or less, and particularly preferably less than 1 mass % with respect to the total mass of the polishing composition. Specifically, the concentration (content) of zirconia particles in the polishing composition is preferably 0.01 mass % or more and mass % or less, more preferably 0.05 mass % or more and 5 mass % or less, further preferably 0.08 mass % or more and 4 mass % or less, even more preferably 0.08 mass % or more and 1 mass % or less, and particularly preferably more than 0.1 mass % and less than 1 mass % with respect to the total mass of the polishing composition. If the content of zirconia particles is within such a range, silicon nitride and a carbon-containing material can be polished at a higher polishing speed. Moreover, defects after polishing (for example, residues, scratches, etc.) can be reduced.

Further, in the case of a polishing composition (that is, concentrate, stock solution of working slurry), which is diluted and then used for polishing, the concentration (content) of zirconia particles is usually appropriately 30 mass % or less and more preferably 25 mass % or less from the viewpoint of storage stability, filterability, and the like, and is more preferably 25 mass % or less. Further, from the viewpoint of taking an advantage of preparing a concentrate thereof, the concentration (content) of zirconia particles is preferably more than 1 mass %, and more preferably 2 mass % or more.

Note that when a polishing composition contains two or more types of zirconia particles, "the concentration (content) of the zirconia particles" is intended to refer to the total amount thereof.

The polishing composition according to the present invention may further contain other abrasive grains other than zirconia particles, as long as the effects of the present invention are not inhibited. Such other abrasive grains may be any of inorganic particles, organic particles, and organic-inorganic composite particles. Specific examples of inorganic particles include particles made of metal oxides such as native silica, cationic modified silica, alumina, ceria, and titania, silicon nitride particles, silicon carbide particles, and boron nitride particles. Specific examples of organic particles include polymethyl methacrylate (PMMA) particles. These other abrasive grains may be used singly or in combination of two or more thereof. Further, these other abrasive grains that may be used herein are commercial products or synthetic products.

Here, the content of these other abrasive grains is preferably 20 mass % or less, more preferably 10 mass % or less, further preferably 5 mass % or less, and particularly preferably 1 mass % or less with respect to that total mass of abrasive grains. Most preferably, the content of other abrasive grains is 0 mass %, that is, abrasive grains are in a form consisting of only zirconia particles.

[pH and pH Adjusting Agent]

The pH of the polishing composition according to the present invention is preferably less than 7. With the pH of less than 7, the polishing speed for silicon nitride and a carbon-containing material can be maintained at a high level. The pH of the polishing composition is preferably 6.5 or less, more preferably 6.0 or less, and further preferably less than 6.0. Moreover, the lower limit of the pH is preferably 1.0 or more, more preferably 2.0 or more, and further preferably 2.5 or more. Specifically, the pH of the polishing composition according to the present invention is preferably 1.0 or more and 6.5 or less, more preferably 2.0 or more and 6.0 or less, and further preferably 2.5 or more and less than 6.0. When a desired component is mixed and the above desired pH cannot be obtained, the polishing composition of the present invention may also contain a pH adjusting agent. Specifically, in an embodiment of the present invention, the polishing composition further contains a pH adjusting agent. In an embodiment of the present invention, the polishing composition is substantially composed of zirconia particles, a dispersing medium, and a pH adjusting agent. Here, the expression "the polishing composition is essentially composed of zirconia particles, a dispersing medium, and a pH adjusting agent" is intended to mean that the total content of zirconia particles, a dispersing medium and a pH adjusting agent exceeds 99 mass % (upper limit: 100 mass %) with respect to the polishing composition. Preferably, the polishing composition is composed of zirconia particles, a dispersing medium and a pH adjusting agent (the above total content=100 mass %).

A pH adjusting agent may be any of an inorganic acid, an organic acid, and an alkali (base). The pH adjusting agent (s) can be used singly or in combination of two or more thereof.

Specific examples of an inorganic acid that can be used as a pH adjusting agent include hydrochloric acid, sulfuric acid, nitric acid, hydrofluoric acid, boric acid, carbonic acid, hypophosphorous acid, phosphorous acid, and phosphoric acid. Of these, hydrochloric acid, sulfuric acid, nitric acid or phosphoric acid is preferable, and nitric acid is more preferable.

Specific examples of an organic acid that can be used as a pH adjusting agent include formic acid, acetic acid, propionic acid, butyric acid, valeric acid, 2-methyl butyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethyl hexoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, lactic acid, diglycolic acid, 2-furancarboxylic acid, 2,5-furandicarboxylic acid, 3-furancarboxylic acid, 2-tetrahydrofuran carboxylic acid, methoxyacetic acid, methoxyphenylacetic acid, phenoxyacetic acid, methansulfonic acid, ethanesulfonic acid and isethionic acid.

Instead of an inorganic acid or an organic acid, or in a combination with an inorganic acid or an organic acid, a salt such as an alkali metal salt of an inorganic acid or an organic acid may also be used as a pH adjusting agent. In the case of a combination of a weak acid and a strong base, that of a strong acid and a weak base, or that of a weak acid and a weak base, the pH-buffering action can be expected.

Specific examples of an alkali (base) that can be used as a pH adjusting agent can include ammonia, sodium hydroxide, potassium hydroxide, and tetramethylammonium hydroxide. The amount of a pH adjusting agent to be added is not particularly limited and may be adjusted as appropriate in such a manner that the polishing composition has a desired pH.

The pH of the polishing composition can be measured using a pH meter, for example, and specifically can be measured by the method described in Examples.

[Other Components]

The polishing composition according to the present invention may further contain known additives that can be used for the polishing composition, as long as the effects of the present invention are not inhibited, such as a dispersing agent, an oxidizing agent, a complexing agent, a surfactant, an antiseptic agent, and an antifungal agent. Of these, the polishing composition preferably contains at least one of an oxidizing agent and an antifungal agent. The polishing composition according to the present invention is acidic. Therefore, the polishing composition more preferably contains an antifungal agent. Specifically, in an embodiment of the present invention, the polishing composition is substantially composed of zirconia particles, a dispersing medium, and at least one selected from the group consisting of a pH adjusting agent, an oxidizing agent and an antifungal agent. In an embodiment of the present invention, the polishing composition is substantially composed of zirconia particles, a dispersing medium, a pH adjusting agent, and at least one of an oxidizing agent and an antifungal agent. Here, the expressions "the polishing composition is substantially composed of zirconia particles, a dispersing medium, and at least one selected from the group consisting of a pH adjusting agent, an oxidizing agent, and an antifungal agent" and "the polishing composition is substantially composed of zirconia particles, a dispersing medium, a pH adjusting agent, and at least one of an oxidizing agent and an antifungal agent" are intended to mean that the total content of zirconia particles, a dispersing medium, a pH adjusting agent, an oxidizing agent and an antifungal agent (when contained) exceeds 99 mass % (upper limit: 100 mass %) with respect to the polishing composition. Preferably, the polishing composition is composed of zirconia particles, a dispersing medium, a pH adjusting agent, and at least one of an oxidizing agent and an antifungal agent (when contained) (the above total content=100 mass %).

<Oxidizing Agent>

An oxidizing agent has an effect of oxidizing a surface of an object to be polished, and can further improve the polishing speed of a polishing composition for polishing the object to be polished.

Examples of an oxidizing agent include hydrogen peroxide, sodium peroxide, barium peroxide, ozone water, a silver (II) salt, an iron (III) salt, permanganic acid, chromic acid, dichromatic acid, peroxodisulfuric acid, peroxophosphoric acid, peroxosulfuric acid, peroxoboric acid, performic acid, peracetic acid, perbenzoic acid, perphthalic acid, hypochlorous acid, hypobromous acid, hypoiodous acid, chloric acid, chlorous acid, perchloric acid, bromic acid, iodic acid, periodic acid, persulfuric acid, dichloroisocyanuric acid, and salts thereof. These oxidizing agents can be used singly or in combination of two or more thereof. Of these, hydrogen peroxide, potassium permanganate, sodium permanganate, ammonium persulfate, periodic acid, hypochlorous acid, and sodium dichloroisocyanurate are preferable, and hydrogen peroxide, potassium permanganate, and sodium permanganate are more preferable.

When the polishing composition of the present invention further contains an oxidizing agent, the concentration (content) of the oxidizing agent in the polishing composition is not particularly limited. For example, In the case of a working slurry (polishing slurry), the concentration (content) of the oxidizing agent in the polishing composition is preferably 0.1 mass % or more and 4 mass % or less, more preferably 0.5 mass % or more and 3 mass % or less, and further preferably 1 mass % or more and 2 mass % or less with respect to the total mass of the polishing composition. With the concentration within such a range, an organic material can be polished at a higher polishing speed. Moreover, the number of scratches made after polishing can be reduced. Note that when the polishing composition contains two or more types of oxidizing agent, the concentration (content) of the oxidizing agents is intended to mean the total amount of them.

<Antifungal Agent (Antiseptic Agent)>

An antifungal agent (antiseptic agent) is not particularly limited, and can be selected as appropriate depending on the desired applications and purposes. Specifically, examples thereof include isothiazolinone-based antiseptic agents such as 2-methyl-4-isothiazolin-3-one, 5-chloro-2-methyl-4-isothiazolin-3-one, and 1,2-benzisothiazol-3(2H)-one (BIT), and phenoxyethanol. In addition, isothiazolinone-based antiseptic agents such as 1,2-benzisothiazol-3(2H)-one (BIT) can also play a role as a pH adjusting agent (alkaline compound).

The above antifungal agents (antiseptic agents) can be used singly or in combination of two or more thereof.

When the polishing composition contains an antifungal agent (antiseptic agent), the concentration (content) of the antifungal agent (antiseptic agent) in the polishing composition is not particularly limited. For example, in the case of a polishing composition (typically, a polishing liquid in the form of slurry, and may also be referred to as a working slurry or a polishing slurry) that is directly used as a polishing liquid for polishing an object to be polished, the lower limit of the concentration (content) of the antifungal agent (antiseptic agent) in the polishing composition is preferably 0.001 mass % or more, and more preferably 0.01 mass % or more. Further, the upper limit of the concentration (content) of the antifungal agent (antiseptic agent) is preferably 3 mass % or less, and more preferably less than 1 mass %. Specifically, the concentration (content) of the antifungal agent (antiseptic agent) in the polishing composition is preferably 0.001 mass % or more and 3 mass % or less, and more preferably 0.01 mass % or more and less than 1 mass %. With the concentration within such a range, a sufficient effect for inactivating or disrupting microorganisms can be obtained.

Further, in the case of a polishing composition that is diluted and then used for polishing (specifically, a concentrate, the stock solution of a working slurry), the concentration (content) of an antifungal agent (antiseptic agent) is usually appropriately 10 mass % or less and more preferably 5 mass % or less from the viewpoint of improving the polishing speed, etc. Further, from the viewpoint of treating a polishing composition after the use thereof for polishing, that is, from the viewpoint of unloading waste water treatment, the concentration (content) of an antifungal agent (antiseptic agent) is preferably 0.1 mass % or more, and more preferably 1 mass % or more.

In addition, when a polishing composition contains two or more types of antifungal agent (antiseptic agent), the above concentration (content) is intended to mean the total amount of these agents.

The polishing composition according to the present invention may further contain a dispersing agent capable of suppressing the aggregation of inorganic particles, such as the above-mentioned malic acid, malonic acid, polyacrylic acid, polyvinyl alcohol, and sugar alcohol. Of these dispersing agents, a sugar alcohol is preferable. Specifically, in an embodiment of the present invention, the polishing composition further contains a sugar alcohol.

The type and preferred molecular weight of a sugar alcohol are the same as those in the content described for the above inorganic particle-containing slurry, and thus the description is omitted.

Specifically, in an embodiment of the present invention, the polishing composition is substantially composed of zirconia particles, a dispersing medium, a dispersing agent, and at least one selected from the group consisting of a pH adjusting agent, an oxidizing agent and an antifungal agent. In an embodiment of the present invention, the polishing composition is substantially composed of zirconia particles, a dispersing medium, a pH adjusting agent and a dispersing agent. In an embodiment of the present invention, the polishing composition is substantially composed of zirconia particles, a dispersing medium, a pH adjusting agent, a dispersing agent, and at least one of an oxidizing agent and an antifungal agent. Here, the expressions "the polishing composition is substantially composed of zirconia particles, a dispersing medium, a pH adjusting agent and a dispersing agent", "the polishing composition is substantially composed of zirconia particles, a dispersing medium, a dispersing agent, and at least one selected from the group consisting of a pH adjusting agent, an oxidizing agent and an antifungal agent" and "the polishing composition is substantially composed of zirconia particles, a dispersing medium, a pH adjusting agent, a dispersing agent, and at least one of an oxidizing agent and an antifungal agent" are intended to mean that the total content of zirconia particles, a dispersing medium, and a dispersing agent, and a pH adjusting agent, an oxidizing agent and an antifungal agent (when contained) exceeds 99 mass % (upper limit: 100 mass %) with respect to the polishing composition. Preferably, the polishing composition is composed of zirconia particles, a dispersing medium, a pH adjusting agent and a dispersing agent (the above total content=100 mass %) (Examples). Preferably, the polishing composition is composed of zirconia particles, a dispersing medium, a dispersing agent, and at least one selected from the group consisting of a pH adjusting agent, an oxidizing agent and an antifungal agent (the above total content=100 mass %). Preferably, the polishing composition is composed of zirconia particles, a dispersing medium, a pH adjusting agent, a dispersing agent, and at least one of an oxidizing agent and an antifungal agent (the above total content=100 mass %).

Specific types of a sugar alcohol that is a preferable dispersing agent are the same as those in the content described above and thus the description is omitted.

When the polishing composition according to the present invention further contains a dispersing agent (particularly, sugar alcohol), the concentration (content) of the dispersing agent (particularly, sugar alcohol) is not particularly limited, and can be selected as appropriate depending on the desired applications and purposes. For example, in the case of a working slurry (polishing slurry), the concentration (content) of a dispersing agent (particularly, sugar alcohol) in the polishing composition is 0.001 mass % (10 ppm) or more, preferably 0.005 mass % (50 ppm) or more, more preferably more than 0.005 mass % (50 ppm), and further preferably 0.008 mass % (80 ppm) or more with respect to the total mass of the polishing composition. Further, the upper limit of the concentration (content) of a dispersing agent (particularly, sugar alcohol) in the polishing composition is, for example, 30 mass % or less, preferably 3 mass % or less, more preferably 0.5 mass % (5,000 ppm) or less, further preferably 0.1 mass % (1,000 ppm) or less, and particularly preferably 0.05 mass % (500 ppm) or less with respect to the total mass of the polishing composition. Specifically, the concentration (content) of a dispersing agent (particularly, sugar alcohol) is, for example, 0.001 mass % or more and 30 mass % or less, preferably 0.005 mass % or more and 3 mass % or less, more preferably more than 0.005 mass % and 0.5 mass % or less, further preferably 0.008 mass % or more and 0.1 mass % or less, and particularly preferably 0.008 mass % or more and 0.05 mass % or less with respect to the total mass of the polishing composition. With the content of a dispersing agent within such a range, good dispersibility can be maintained even after long-term storage of abrasive grains (particularly, zirconia particles).

[Method for Producing Polishing Composition]

A method for producing the polishing composition according to the embodiments is not particularly limited. For example, the polishing composition can be obtained by mixing and stirring a zirconia particle-containing slurry, and another additive (s) as needed. Details of each component are as described above.

The temperature for mixing each component is not particularly limited, and is preferably 10° C. or higher and 40° C. or lower. Heating may also be performed to increase the rate of dissolution. Further the time for mixing is not particularly limited, as long as homogeneous mixing can be performed.

[Polishing Method and Method for Producing Semiconductor Substrate]

As described above, the polishing composition according to the embodiments is particularly suitably used for polishing an object to be polished having silicon nitride and a carbon-containing material. Therefore, the present invention provides a polishing method for polishing an object to be polished containing at least one of silicon nitride and a carbon-containing material with the use of the polishing composition according to the embodiments. Further, the present invention provides a method for producing a semiconductor substrate, which comprises polishing a semiconductor substrate containing at least one of silicon nitride and a carbon-containing material by the above polishing method.

As a polishing apparatus, it is possible to use a general polishing apparatus provided with a holder for holding a substrate or the like having an object to be polished, a motor or the like capable of changing the number of revolutions, and a platen to which a polishing pad (polishing cloth) can be attached.

As the polishing pad, a general nonwoven fabric, polyurethane, a porous fluororesin, or the like can be used without any particular limitation. The polishing pad is preferably grooved such that a polishing liquid can be stored therein.

Regarding polishing conditions, for example, the rotational speed of a platen and a carrier is preferably 10 rpm $(0.17 \text{ s}^{-1})$ or more and 500 rpm $(8.33 \text{ s}^{-1})$. The pressure (polishing pressure) to be applied to a substrate having an object to be polished is preferably 0.5 psi (3.45 kPa) or more and 10 psi (68.9 kPa).

A method for supplying the polishing composition to a polishing pad is also not particularly limited. For example, a method for continuously supplying the polishing composition using a pump or the like is employed. The supply amount is not limited, but a surface of the polishing pad is preferably covered all the time with the polishing composition according to the present invention.

The polishing composition according to the embodiments may be of a single-fluid type or multi-fluid type including double-fluid type. Further, the polishing composition according to the present invention may be prepared by, for example, diluting an undiluted solution of the polishing composition 1.5 or more times and 20 or less times, 1.5 or more types and 10 or less times, 2 or more times and 10 or less times, or 2 or more times and 5 or less times based on the volume using a diluent such as water.

The polished object to be polished after completion of polishing is subjected to rinse polishing treatment or cleaning treatment as needed, so that residues on a surface of the polished object to be polished can be reduced. Cleaning treatment is as described below.

Examples of a method for performing cleaning treatment include: (i) a method that involves bringing a cleaning brush into contact with one surface or both surfaces of a polished object to be polished while holding the polished object to be polished, and then scrubbing the surface(s) of the polished object to be polished with a cleaning brush while supplying a cleaning composition (or composition for surface treatment) containing a surfactant or the like to the contact portion; and (ii) a method that involves immersing a polished object to be polished in a cleaning composition (or a composition for surface treatment), followed by sonication or stirring (dip type). Through the use of these methods, residues on a surface(s) of a polished object to be polished are removed by frictional force generated by the use of a cleaning brush or mechanical force generated by sonication or stirring, and chemical action exerted by a surfactant or the like.

In method (i) above, a method for bringing a cleaning composition (or a composition for surface treatment) to be in contact with a polished object to be polished is not particularly limited, and examples thereof include a spin-type method that involves rotating a polished object to be polished at a high speed while supplying a cleaning composition onto the polished object to be polished from a nozzle, and a spray-type method that involves spraying a cleaning composition over a polished object to be polished for cleaning.

From the point of capability of efficient decontamination within a short time, the spin-type method or the spray-type method is preferably employed for cleaning treatment and the spin-type method is further preferable for cleaning treatment.

Examples of an apparatus for performing such cleaning treatment include a batch-type cleaning apparatus, by which a plural number of sheets of a polished object to be polished housed in a cassette are simultaneously subjected to surface treatment, and a sheet-fed type cleaning apparatus, by which a sheet of a polished object to be polished is placed on a holder for surface treatment. From the viewpoint of shortening the cleaning time, etc., the method using a sheet-fed type cleaning apparatus is preferable.

Furthermore, another example of an apparatus for performing cleaning treatment is a polishing apparatus provided with a cleaning facility by which a polished object to be polished is scrubbed with a cleaning brush after removed from a platen. With the use of such a polishing apparatus, cleaning treatment for a polished object to be polished can be more efficiently performed.

As such a polishing apparatus, a general polishing apparatus having a holder for holding a polished object to be polished, a motor capable of changing the number of revolutions, a cleaning brush and the like can be used. As a polishing apparatus, either a single-sided polishing apparatus or a double-sided polishing apparatus may be used.

A cleaning brush is not particularly limited, but a brush made of a resin is preferably used. The material of such a resin brush is not particularly limited, and for example, PVA (polyvinyl alcohol) is preferably used. Further, as a cleaning brush, a sponge made of PVA is particularly preferably used.

Cleaning conditions are also not particularly limited, and can be set as appropriate depending on the type of a polished object to be polished, as well as the type and the amount of residues to be removed. For example, the number of revolutions of a cleaning brush is preferably 10 rpm ($0.17$ s$^{-1}$) or more and 200 rpm ($3.33$ s$^{-1}$) or less, the number of revolutions of a polished object to be polished is preferably 10 rpm ($0.17$ s$^{-1}$) or more and 100 rpm ($1.67$ s$^{-1}$) or less, the pressure (cleaning pressure) to be applied to a polished object to be polished is preferably 0.5 psi (3.45 kPa) or more and 10 psi (68.9 kPa) or less. A method for supplying a cleaning composition (or a composition for surface treatment) for a cleaning brush is also not particularly limited, and for example, a method that involves continuously supplying a cleaning composition via a pump or the like (flowing) is employed. The supply amount is not limited, but a cleaning brush and a surface of an object to be cleaned are preferably covered all the time with a cleaning composition (or a composition for surface treatment), and the supply amount is preferably 10 mL/min or more and 5,000 mL/min or less. The time for cleaning is not particularly limited, but the cleaning time is preferably 5 seconds or more and 180 seconds or less in a step of using the cleaning composition (or a composition for surface treatment) according to an embodiment of the present invention. Within such ranges, residues can be more efficiently removed.

The temperature of a cleaning composition (or a composition for surface treatment) or the like upon cleaning is not particularly limited, may be usually room temperature (25° C.), but the temperature may be increased to about 40° C. or higher and 70° C. or lower to such an extent that the performance is not deteriorated.

In the method (ii) above, conditions for the cleaning method involving immersion are not particularly limited and a known technique can be employed.

Before, after or both before and after cleaning treatment performed according to the methods (i) and (ii) above, cleaning with water may be performed.

Further, a polished object to be polished after cleaning is preferably dried by clearing off water droplets adhered to the surface with the use of a spin dryer etc. Furthermore, a surface of a polished object to be polished may also be dried by air blow-drying.

The embodiments of the present invention are described in detail above, but are explanatory and illustrative only, and are not limited. The scope of the present invention should be obviously construed on the basis of the attached claims.

The present invention encompasses the following aspects and embodiments.

1. A method for producing an inorganic particle-containing slurry, comprising the steps of:

preparing an inorganic particle dispersion containing an inorganic particle and a dispersing medium, and having a pH less than the isoelectric point of the inorganic particle; and adding an alkaline compound to the inorganic particle dispersion in such a manner that the pH does not reach the isoelectric point of the inorganic particle.

2. The method according to 1 above, wherein the inorganic particle is at least one selected from the group consisting of silica particle, zirconia particle, alumina particle, ceria particle, titania particle, and silicon carbide particle.

3. The method according to 1 or 2 above, wherein the alkaline compound is at least one selected from the group consisting of alkylamine oxide, ammonia, quaternary ammonium salt, hydroxide of alkali metal, carbonate, nitrogen-containing heterocyclic compound, and basic amino acid.

4. The method according to any one of 1 to 3 above, wherein the concentration of the inorganic particle in the inorganic particle dispersion is 5 mass % or less.

5. The method according to any one of 1 to 4 above, further comprising a step of filtering a mixture obtained in the step of adding the alkaline compound after the step of adding the alkaline compound.

6. A zirconia particle-containing slurry, wherein the number of particles having a particle size of 1.01 μm or more as measured with an in-liquid particle counter is 10,000 particles/mL or less.

7. The zirconia particle-containing slurry according to 6 above, wherein the number of particles having a particle size of 1.98 μm or more as measured with an in-liquid particle counter is 3,000 particles/mL or less.

8. The zirconia particle-containing slurry according to 6 or 7 above, wherein the number of particles having a particle size of 3.03 μm or more as measured with an in-liquid particle counter is 1,000 particles/mL or less.

9. The zirconia particle-containing slurry according to any one of 6 to 8 above, further containing a sugar alcohol.

10. A polishing composition comprising the zirconia particle-containing slurry according to any one of 6 to 9 above.

11. The polishing composition according to 10 above, which is used for polishing an object to be polished containing at least one of silicon nitride and a carbon-containing material.

12. A polishing method comprising polishing an object to be polished containing at least one of silicon nitride and a carbon-containing material with the use of the polishing composition according to 10 or 11 above.

EXAMPLES

The present invention will be described in greater detail with the following Examples and Comparative Examples. However, the technical scope of the present invention is not limited to only the following Examples. Note that unless otherwise specified, "%" and "part(s)" refer to "mass %" and "parts by mass", respectively. Further, in the following Examples, unless otherwise specified, an operation was performed under conditions of room temperature (20° C. or higher and 25° C. or lower)/relative humidity of 40% RH or more and 50% RH or less. In addition, each physical property was measured as follows.

<pH>

The pHs of raw materials, a colloidal zirconia dispersion, a colloidal silica dispersion, an inorganic particle dispersion, and an aqueous alkaline solution, as well as the pH of a finally obtained polishing composition were each measured at a liquid temperature of 25° C. using a pH meter (manufactured by HORIBA, Ltd., a glass electrode type hydrogen ion concentration indicator (model: F-23)).

<Particle Size of Inorganic Particles>

D50 (average secondary particle size) of inorganic particles in the colloidal zirconia dispersion and the colloidal silica dispersion, as well as D10, D50 and D90 of inorganic particles in a polishing composition were measured using UPA-UT151 (manufactured by MicrotracBEL Corporation).

<Zeta Potential and Isoelectric Point of Inorganic Particles>

(Measurement of Zeta Potential)

The zeta potentials of inorganic particles in the colloidal zirconia dispersion, the colloidal silica dispersion, and the polishing composition were measured using a zeta potential measuring apparatus (trade name "Zetasizer nano ZSP") manufactured by Malvern Instruments.

(Measurement of Isoelectric Point)

To each of the colloidal zirconia dispersion and the colloidal silica dispersion, 0.01M or more and 0.1M or less of NaOH and HCl were added as pH adjusting agents, thereby preparing zeta potential measuring solutions adjusted to have pHs ranging from 3.0 to 10.0 (1.0 increments). Here, pHs were measured using a pH meter (model: F-71) manufactured by HORIBA, Ltd.

The zeta potentials of inorganic particles contained in the above-prepared zeta potential measuring solutions having pHs ranging from 3.0 to 10.0 (1.0 increments) were measured using the above zeta potential measuring apparatus. The pH of the isoelectric point of inorganic particles was calculated by the above-described formula with the use of a pH before and a pH after the change of the sign of the zeta potential of inorganic particles and zeta potentials at the pH before and the pH after the change, respectively.

<LPC Measurement>

The number of particles contained in the colloidal zirconia dispersion and the same in the colloidal silica dispersion before the addition of an alkaline compound, as well as the number of particles contained in the finally obtained inorganic particle-containing slurry (polishing composition) were measured using AccuSizer (registered trademark) FX (manufactured by Particle Sizing Systems, U.S.). Specifically, regarding the colloidal zirconia dispersion and the colloidal silica dispersion, the number of particles having a particle size of 1.01 μm or more was measured. Regarding the inorganic particle-containing slurry (polishing composition), the number of particles having a particle size of 1.01 μm or more, the number of particles having a particle size of 1.98 μm or more, and the number of particles having a particle size of 3.03 μm or more were each measured.

Example 1

A dispersion containing colloidal zirconia (manufactured by Nyacol Nano Technologies, Inc., NYACOL (registered trademark) ZR70/20, the concentration of zirconia particles: 20 mass %, water dispersion, pH2.7, D50 of zirconia particles: 59 nm, zeta potential of zirconia particles: positive) was prepared.

Ultrapure water (475 g) was added to the prepared colloidal zirconia dispersion (25 g), thereby preparing an inorganic particle dispersion (pH: 4.3) in which the concentration of zirconia particles was 1 mass %. Zirconia particles in the inorganic particle dispersion had a zeta potential of 35.1 mV and an isoelectric point of pH9.0. Moreover, the number of particles having a particle size of 1.01 μm or more in the inorganic particle dispersion was measured to be 24,957 particles/mL.

Separately, to ultrapure water (498.7 g), a 30 mass % aqueous solution (1 g) of 1,2-benzisothiazol-3(2H)-one (denoted as "BIT" in Tables) as an alkaline compound and 29 mass % aqueous ammonia (0.3 g) were added, thereby preparing an aqueous alkaline solution (500 g) (pH: 9.5).

To the above inorganic particle dispersion (125 g) being stirred with a stirring bar having a diameter of 2 cm at 500 rpm (8.33 s⁻¹), the above aqueous alkaline solution was added at an addition rate of 100 mL/min. The resultant was stirred at 25° C. for 10 minutes, and thus a zirconia particle-containing slurry (pH: 5.0) was prepared in a total amount of 1 kg. At this time, the pH of the mixture during addition of the aqueous alkaline solution was less than the isoelectric point of zirconia particles.

Example 2

To 25 g of a colloidal zirconia dispersion (manufactured by Nyacol Nano Technologies, Inc., NYACOL (registered trademark) ZR70/20, concentration of zirconia particles: 20 mass %, water dispersion, pH2.7, D50 of zirconia particles: 59 nm, zeta potential of zirconia particles: positive), which was the same as the dispersed solution prepared in Example 1, ultrapure water (100 g) was added, thereby preparing an inorganic particle dispersion (pH: 3.7) in which the concentration of zirconia particles was 4 mass %. Zirconia particles in the inorganic particle dispersion had a zeta potential of 35.1 mV and an isoelectric point of pH 9.0. Moreover, the number of particles having a particle size of 1.01 μm or more in the inorganic particle dispersion was measured to be 24,957 particles/mL.

Separately, to ultrapure water (498 g), a 30 mass % aqueous solution (1 g) of 1,2-benzisothiazol-3(2H)-one as an alkaline compound and 29 mass % of aqueous ammonia (1 g) were added, thereby preparing an aqueous alkaline solution (500 g) (pH: 10.0).

To the above inorganic particle dispersion being stirred with a stirring bar having a diameter of 2 cm at 500 rpm (8.33 s⁻¹), the above aqueous alkaline solution was added at an addition rate of 100 mL/min. The resultant was stirred at 25° C. for 10 minutes, and then ultrapure water (375 g) was further added, thereby preparing a zirconia particle-containing slurry (pH: 5.0) in a total amount of 1 kg. At this time, the pH of the mixture during addition of the aqueous alkaline solution was less than the isoelectric point of zirconia particles.

Example 3

A solution (pH: 8.5) was prepared by dissolving 3-aminopropyltrimethoxysilane (APTES) (0.1 g) in ultrapure water (473.9 g). To the solution, 25 g of a colloidal silica dispersion (concentration of silica particles: 20 mass %, water dispersion, pH: 7.5, D50 of silica particles: 37 nm) was added, followed by mixing and stirring at 25° C. for 300 minutes. Therefore, an inorganic particle dispersion (pH8.5) containing amino group-modified colloidal silica particles, the surface of which had been modified with amino groups, at a concentration of 1 mass % was obtained. Furthermore, 60 mass % nitric acid (0.2 g) was added, and thus an inorganic particle dispersion having a pH of 4.3 was obtained. Amino group-modified colloidal silica particles in the inorganic particle dispersion adjusted to have a pH of 4.3 had a zeta potential of 32.1 mV and an isoelectric point of pH6.0. Further, the number of particles having a particle size of 1.01 μm or more in the inorganic particle dispersion was measured to be 6,435 particles/mL. Furthermore, the obtained amino group-modified colloidal silica particles had a positive zeta potential at a pH of less than 3.

Separately, to ultrapure water (498.7 g), a 30 mass % aqueous solution (1 g) of 1,2-benzisothiazol-3(2H)-one as an alkaline compound and 29 mass % aqueous ammonia (0.3 g) were added, thereby preparing an aqueous alkaline solution (500 g) (pH9.5).

To the inorganic particle dispersion (125 g) adjusted to have a pH of 4.3 and being stirred with a stirring bar having a diameter of 2 cm at 500 rpm (8.33 s$^{-1}$), the above aqueous alkaline solution was added at an addition rate of 100 mL/min. The resultant was stirred at 25° C. for 10 minutes, and then ultrapure water (375 g) was added, thereby preparing an amino group-modified colloidal silica particle-containing slurry (pH: 5.0) in a total amount of 1 kg. At this time, the pH of the mixture during addition of the aqueous alkaline solution was less than the isoelectric point of silica particles.

Example 4

A colloidal zirconia-containing dispersed solution (manufactured by Nyacol Nano Technologies, Inc., NYACOL (registered trademark) ZR70/20, concentration of zirconia particles: 20 mass %, water dispersion, pH2.7, D50 of zirconia particles: 43 nm, zeta potential of zirconia particles: positive) was prepared.

Ultrapure water (475 g) was added to the prepared colloidal zirconia dispersion (25 g), thereby preparing an inorganic particle dispersion (pH: 4.3) in which the concentration of zirconia particles was 1 mass %. Zirconia particles in the inorganic particle dispersion had a zeta potential of 35.1 mV and an isoelectric point of pH9.0. Moreover, the number of particles having a particle size of 1.01 μm or more in the inorganic particle dispersion was measured to be 3,830 particles/mL.

Separately, to ultrapure water (498.7 g), a 30 mass % aqueous solution (1 g) of 1,2-benzisothiazol-3(2H)-one as an alkaline compound and 29 mass % aqueous ammonia (0.3 g) were added, thereby preparing an aqueous alkaline solution (500 g) (pH: 9.5).

To the above inorganic particle dispersion being stirred with a stirring bar having a diameter of 2 cm at 500 rpm (8.33 s$^{-1}$), the above aqueous alkaline solution was added at an addition rate of 100 mL/min. The resultant was stirred at 25° C. for 10 minutes, and thus a zirconia particle-containing slurry (pH: 5.0) in a total amount of 1 kg was prepared. At this time, the pH of the mixture during addition of the aqueous alkaline solution was less than the isoelectric point of zirconia particles.

Example 5

A colloidal zirconia dispersion (manufactured by Nyacol Nano Technologies, Inc., NYACOL (registered trademark) ZR100/20, concentration of zirconia particles: 20 mass %, water dispersion, pH2.3, D50 of zirconia particles: 140 nm) was prepared.

Ultrapure water (475 g) was added to the prepared colloidal zirconia dispersion (25 g), thereby preparing an inorganic particle dispersion (pH: 3.6), in which the concentration of zirconia particles was 1 mass %. Zirconia particles in the inorganic particle dispersion had a zeta potential of 35.1 mV and an isoelectric point of pH9.0. Moreover, the number of particles having a particle size of 1.01 μm or more in the inorganic particle dispersion was measured to be 35,363 particles/mL.

Separately, to ultrapure water (498.7 g), a 30 mass % aqueous solution (1 g) of 1,2-benzisothiazol-3(2H)-one as an alkaline compound and 29 mass % aqueous ammonia (1.2 g) were added, thereby preparing an aqueous alkaline solution (500 g) (pH: 10.2).

To the above inorganic particle dispersion being stirred with a stirring bar having a diameter of 2 cm at 500 rpm (8.33 s$^{-1}$), the above aqueous alkaline solution was added at an addition rate of 100 mL/min. The resultant was stirred at 25° C. for 10 minutes, and thus a zirconia particle-containing slurry (pH: 5.0) in a total amount of 1 kg was prepared. At this time, the pH of the mixture during addition of the aqueous alkaline solution was less than the isoelectric point of zirconia particles.

Comparative Example 1

To ultrapure water (498.7 g), a 30 mass % aqueous solution (1 g) of 1,2-benzisothiazolin-3(2H)-one as an alkaline compound and 29 mass % aqueous ammonia (0.3 g) were added, thereby preparing an aqueous alkaline solution (500 g) (pH: 9.5).

Separately, ultrapure water (475 g) was added to 25 g of a colloidal zirconia dispersion (manufactured by Nyacol Nano Technologies, Inc., NYACOL (registered trademark) ZR70/20, concentration of zirconia particles: 20 mass %, water dispersion, pH2.7, D50 of zirconia particles: 59 nm, zeta potential of zirconia particles: positive) which was the same as the dispersed solution prepared in Example 1, thereby preparing an inorganic particle dispersion (pH: 4.3) in which the concentration of zirconia particles was 1 mass %. Zirconia particles in the inorganic particle dispersion had a zeta potential of 35.1 mV, and an isoelectric point of pH9.0. Moreover, the number of particles having a particle size of 1.01 μm or more in the inorganic particle dispersion was measured to be 24,957 particles/mL.

To the above aqueous alkaline solution being stirred with a stirring bar having a diameter of 2 cm at 500 rpm (8.33 s$^{-1}$), the above inorganic particle dispersion was added at an addition rate of 100 mL/min, thereby preparing a zirconia particle-containing slurry (pH: 5.0) in a total amount of 1 kg. At this time, the pH of the mixture during addition of the inorganic particle dispersion was the same as or higher than the isoelectric point of zirconia particles.

Comparative Example 2

Ultrapure water (475 g) was added to 25 g of a colloidal zirconia dispersion (manufactured by Nyacol Nano Technologies, Inc., NYACOL (registered trademark) ZR70/20, concentration of zirconia particles: 20 mass %, water dispersion, pH2.7, D50 of zirconia particles: 59 nm, zeta potential of zirconia particles: positive) which was the same as the dispersed solution prepared in Example 1, thereby preparing an inorganic particle dispersion (pH: 4.3) in which the concentration of zirconia particles was 1 mass %. Zirconia particles in the inorganic particle dispersion had a zeta potential of 35.1 mV and an isoelectric point of pH9.0. Moreover, the number of particles having a particle size of 1.01 μm or more in the inorganic particle dispersion was measured to be 24,957 particles/mL.

Separately, to ultrapure water (489 g), a 30 mass % aqueous solution (1 g) of 1,2-benzisothiazolin-3(2H)-one as an alkaline compound and 29 mass % aqueous ammonia (10 g) were added, thereby preparing an aqueous alkaline solution (500 g) (pH: 10.8).

To the above inorganic particle dispersion (500 g) being stirred with a stirring bar having a diameter of 2 cm at 500 rpm (8.33 s$^{-1}$), the above aqueous alkaline solution was added at an addition rate of 100 mL/min, thereby preparing a dispersed solution (pH: 9.2) in a total amount of 1 kg. At this time, the pH of the dispersed solution was the same as or higher than the isoelectric point of zirconia particles. Thereafter, 60 mass % nitric acid (2.5 g) was further added to the dispersed solution, thereby preparing a zirconia particle-containing slurry (pH: 5.0).

The compositions of the inorganic particle dispersions and aqueous alkaline solutions used in Examples and Comparative Examples are shown in Table 1 below.

an addition rate of 100 mL/min, thereby preparing a mixture in a total amount of 1 kg. At this time, the pH of the mixture during addition of the aqueous alkaline solution was less than the isoelectric point of zirconia particles. The mixture was filtered using a filter having an opening size of 0.2 μm

TABLE 1

| | Inorganic particle dispersion | | | | | | |
|---|---|---|---|---|---|---|---|
| | Type of inorganic particles | Isoelectric point pH of inorganic particles | D50 (nm) of inorganic particles | pH before preparation | Concentration (mass %) of inorganic particles before preparation | pH after preparation | Concentration (mass %) of inorganic particles after preparation |
| Example 1 | Zirconia | 9.0 | 59 | 2.7 | 20 | 4.3 | 1 |
| Example 2 | Zirconia | 9.0 | 59 | 2.7 | 20 | 3.7 | 4 |
| Example 3 | Silica | 6.0 | 7 | 8.5 | 20 | 4.3 (nitric acid added) | 1 |
| Example 4 | Zirconia | 9.0 | 43 | 2.7 | 20 | 4.3 | 1 |
| Example 5 | Zirconia | 9.0 | 140 | 2.3 | 20 | 3.6 | 1 |
| Comparative example 1 | Zirconia | 9.0 | 59 | 2.7 | 20 | 4.3 | 1 |
| Comparative example 2 | Zirconia | 9.0 | 59 | 2.7 | 20 | 4.3 | 1 |

| | Inorganic particle dispersion | | Aqueous alkaline solution | | | | |
|---|---|---|---|---|---|---|---|
| | Zeta potential (mV) of inorganic particles after preparation | LPC 1.01 μm or more (particles/mL) after preparation | Alkaline compound 1 | | Alkaline compound 2 | | |
| | | | Type | Amount added [Final concentration in slurry] (mass %) | Type | Amount added [Final concentration in slurry] (mass %) | pH |
| Example 1 | 35.1 | 24957 | BIT | 0.03 | NH$_3$ | 0.0087 | 9.5 |
| Example 2 | 35.1 | 24957 | BIT | 0.03 | NH$_3$ | 0.029 | 10.0 |
| Example 3 | 32.1 | 6435 | BIT | 0.03 | NH$_3$ | 0.0087 | 9.5 |
| Example 4 | 35.1 | 3830 | BIT | 0.03 | NH$_3$ | 0.0087 | 9.5 |
| Example 5 | 35.1 | 35363 | BIT | 0.03 | NH$_3$ | 0.0348 | 10.2 |
| Comparative example 1 | 35.1 | 24957 | BIT | 0.03 | NH$_3$ | 0.0087 | 9.5 |
| Comparative example 2 | 35.1 | 24957 | BIT | 0.03 | Nitric acid NH$_3$ | 0.15 0.29 | 10.8 |

Example 6

Ultrapure water (475 g) was added to 25 g of a colloidal zirconia dispersion (concentration of zirconia particles: mass %, water dispersion, pH: 2.7, D50 of zirconia particles: 59 nm, zeta potential of zirconia particles: positive) which was the same as the colloidal zirconia dispersion used in Example 1, thereby preparing an inorganic particle dispersion (pH: 4.3) in which the concentration of zirconia particles was 1 mass %. Zirconia particles in the inorganic particle dispersion had a zeta potential of 35.1 mV, and an isoelectric point of pH 9.0. Moreover, the number of particles having a particle size of 1.01 μm or more in the inorganic particle dispersion was measured to be 24,957 particles/mL.

Separately, to ultrapure water (498.7 g), a 30 mass % aqueous solution (1 g) of 1,2-benzisothiazol-3(2H)-one as an alkaline compound and 29 mass % aqueous ammonia (0.3 g) were added, thereby preparing an aqueous alkaline solution (500 g) (pH: 9.5).

To the above inorganic particle dispersion being stirred with a stirring bar having a diameter of 2 cm at 500 rpm (8.33 s$^{-1}$), the above aqueous alkaline solution was added at (manufactured by ROKI TECHNO CO., LTD., product number: 43L-SLF-002), thereby preparing a zirconia particle-containing slurry (pH: 5.0).

Examples 7 to 12

In the same manner as in Example 1, inorganic particle dispersions were obtained.

Separately, to ultrapure water (498.7 g), a 30 mass % aqueous solution (1 g) of 1,2-benzisothiazol-3(2H)-one as an alkaline compound and 29 mass % aqueous ammonia (0.3 g) were added, thereby preparing an aqueous alkaline solution (500 g) (pH: 9.5).

To the above inorganic particle dispersion being stirred with a stirring bar having a diameter of 2 cm at 500 rpm (8.33 s$^{-1}$), the above aqueous alkaline solution was added at an addition rate of 100 mL/min, thereby preparing a mixture in a total amount of 1 kg. At this time, the pH of the mixture during addition of the aqueous alkaline solution was less than the isoelectric point of zirconia particles. Sorbitol was added as a dispersing agent to the mixture. The concentrations (contents) of sorbitol were 0.001 mass % (10 ppm) (Example 7), 0.005 mass % (50 ppm) (Example 8), 0.008 mass % (80 ppm) (Example 9), 0.01 mass % (100 ppm) (Example 10), 0.02 mass % (200 ppm) (Example 11), and 0.05 mass % (500 ppm) (Example 12), respectively, with respect to the total amount of the finally obtained zirconia particle-containing slurry.

Example 13

In the same manner as in Example 1, an inorganic particle dispersion was obtained.

Separately, to ultrapure water (498.7 g), a 30 mass % aqueous solution (1 g) of 1,2-benzisothiazol-3(2H)-one as an alkaline compound and 29 mass % aqueous ammonia (0.3 g) were added, thereby preparing an aqueous alkaline solution (500 g) (pH: 9.5).

To the above inorganic particle dispersion being stirred with a stirring bar having a diameter of 2 cm at 500 rpm ($8.33$ s$^{-1}$), the above aqueous alkaline solution was added at an addition rate of 100 mL/min, thereby preparing a mixture in a total amount of 1 kg. At this time, the pH of the mixture during addition of the aqueous alkaline solution was less than the isoelectric point of zirconia particles. Xylitol was added as a dispersing agent to the mixture. The concentration (content) of xylitol was determined to be 0.01 mass % (100 ppm) with respect to the total amount of the finally obtained zirconia particle-containing slurry. In this manner, a zirconia particle-containing slurry (pH: 5.0) was prepared.

Reference Example 1

An amino group-modified colloidal silica particle-containing slurry (pH: 5.0) prepared in the same manner as in Example 3 above was further filtered using a filter having an opening size of 0.2 μm (manufactured by ROKI TECHNO CO., LTD., product number: 43L-SLF-002), thereby preparing an amino group-modified colloidal silica particle-containing slurry (pH: 5.0) in Reference Example 1.

[LPC and Evaluation of Defect]

<LPC Measurement for Inorganic Particle-Containing Slurry>

The number of particles contained in the inorganic particle-containing slurries obtained in Examples 1 to 13, Comparative Examples 1 and 2, and Reference Example 1 having a particle size of 1.01 μm or more, the number of particles contained in the same having a particle size of 1.98 μm or more, and the number of particles contained in the same having a particle size of 3.03 μm or more were measured using AccuSizer (registered trademark) FX (manufactured by Particle Sizing Systems, U.S.).

<Defects after Polishing and Cleaning>

Inorganic particle-containing slurries obtained in Examples 1 to 13, Comparative Examples 1 and 2, and Reference Example 1 were directly used as polishing compositions to polish (CMP) silicon nitride (Si$_3$N$_4$) substrates under the following polishing conditions.

(Polishing Apparatus and Polishing Conditions)

Object to be polished: silicon wafer (Si$_3$N$_4$ substrate) having a surface on which a silicon nitride (Si$_3$N$_4$) film with a thickness of 2500 Å was formed by CVD (300 mm blanket wafer, manufactured by ADVANTEC CO., LTD.)

Polishing apparatus: manufactured by EBARA CORPORATION FREX300E

Polishing pad: manufactured by NITTA DuPont Incorporated, hard polyurethane pad IC1010

Polishing pressure: 1.0 psi (1 psi=6894.76 Pa, the same applied to the following)

Rotational speed of platen: 83 rpm ($1.38$ s$^{-1}$)

Rotational speed of head (carrier): 77 rpm ($1.28$ s$^{-1}$)

Supply of polishing composition: flowing

Flow rate of polishing composition (slurry): 200 mL/min

Polishing time: 1 minute.

(Cleaning)

Each polished Si$_3$N$_4$ substrate after the above polishing was cleaned by a cleaning method that involves scrubbing the polished Si$_3$N$_4$ substrate using an acid-type surfactant (MCX-SDR4, manufactured by Mitsubishi Chemical Corporation) as a cleaning composition and a cleaning brush; that is, a sponge made of polyvinyl alcohol (PVA) while being pressurized under the following conditions.

(Cleaning Apparatus and Cleaning Conditions)

Cleaning apparatus: manufactured by EBARA CORPORATION FREX300E

Number of revolutions of cleaning brush: 100 rpm ($1.67$ s$^{-1}$)

Number of revolutions of polished object to be polished: 50 rpm ($0.83$ s$^{-1}$)

Cleaning pressure: 1 psi

Cleaning composition type: acidic-type surfactant (MCX-SDR4 manufactured by Mitsubishi Chemical Corporation)

Supply amount of cleaning composition: 1,000 mL/min

Cleaning time: 1 minute.

The surface of the cleaned Si$_3$N$_4$ substrate was subjected to inspection, by which the total number of defects (residues) having a size of 0.1 μm or more was measured using a wafer defect inspection system (SP-5, manufactured by KLA-Tencor Corporation). Inspection was performed for the remaining portions except a portion having a width of 5 mm from the peripheral end of one surface of the polished Si$_3$N$_4$ substrate.

Evaluation results are shown in Table 2 below.

TABLE 2

| | | Polishing composition (Inorganic particle-containing slurry) | | | | | | |
|---|---|---|---|---|---|---|---|---|
| | | Concentration (mass %) of | Zeta potential (mV) of | Dispersing agent | | Particle size of inorganic particles | | |
| | pH | inorganic particles | inorganic particles | Type | Concentration (ppm) | D10 (nm) | D50 (nm) | D90 (nm) |
| Example 1 | 5.0 | 0.5 | 28 | — | — | 38 | 60 | 98 |
| Example 2 | 5.0 | 0.5 | 28 | — | — | 39 | 62 | 99 |
| Example 3 | 5.0 | 0.5 | 33 | — | — | 14 | 41 | 75 |
| Example 4 | 5.0 | 0.5 | 28 | — | — | 27 | 44 | 59 |
| Example 5 | 5.0 | 0.5 | 29 | — | — | 99 | 147 | 270 |
| Example 6 | 5.0 | 0.5 | 28 | — | — | 36 | 58 | 99 |

TABLE 2-continued

| | | | | | | | | | |
|---|---|---|---|---|---|---|---|---|---|
| Example 7 | 5.0 | 0.5 | 28 | Sorbitol | 10 | 38 | 60 | 100 |
| Example 8 | 5.0 | 0.5 | 28 | Sorbitol | 50 | 37 | 59 | 102 |
| Example 9 | 5.0 | 0.5 | 28 | Sorbitol | 80 | 38 | 61 | 100 |
| Example 10 | 5.0 | 0.5 | 28 | Sorbitol | 100 | 37 | 60 | 101 |
| Example 11 | 5.0 | 0.5 | 28 | Sorbitol | 200 | 36 | 58 | 99 |
| Example 12 | 5.0 | 0.5 | 28 | Sorbitol | 500 | 3 | 59 | 100 |
| Example 13 | 5.0 | 0.5 | 28 | Xylitol | 100 | 36 | 57 | 100 |
| Comparative example 1 | 5.0 | 0.5 | 32 | — | — | 45 | 71 | 112 |
| Comparative example 2 | 5.0 | 0.5 | 28 | — | — | 54 | 91 | 134 |
| Reference example 1 | 5.0 | 0.5 | 33 | — | — | 13 | 41 | 76 |

| | Polishing composition (Inorganic particle-containing slurry) LPC | | | After polishing•cleaning |
|---|---|---|---|---|
| | 1.01 µm or more (particles/mL) | 1.98 µm or more (particles/mL) | 3.03 µm or more (particles/mL) | 0.1 µm or more defects (particles) |
| Example 1 | 5748 | 557 | 365 | 760 |
| Example 2 | 7890 | 661 | 388 | 1253 |
| Example 3 | 5911 | 321 | 124 | 769 |
| Example 4 | 4321 | 412 | 211 | 760 |
| Example 5 | 9780 | 2436 | 898 | 1968 |
| Example 6 | 2746 | 243 | 32 | 244 |
| Example 7 | 2714 | 236 | 25 | 247 |
| Example 8 | 2694 | 249 | 21 | 240 |
| Example 9 | 2684 | 231 | 19 | 239 |
| Example 10 | 2668 | 230 | 20 | 230 |
| Example 11 | 2728 | 241 | 23 | 235 |
| Example 12 | 2703 | 224 | 19 | 237 |
| Example 13 | 2719 | 235 | 30 | 247 |
| Comparative example 1 | 14562 | 4870 | 1473 | 16783 |
| Comparative example 2 | 36479 | 8902 | 2326 | 27386 |
| Reference example 1 | 1276 | 132 | 17 | 120 |

As is clear from Table 2 above, the inorganic particle-containing slurries of Examples 1 to 13 contained the small number of coarse particles as measured using an in-liquid particle counter. Further, a $Si_3N_4$ substrate was polished using the slurry as a polishing composition, revealing that defects on a surface of a polished object to be polished were reduced. On the other hand, the inorganic particle-containing slurries of Comparative Examples 1 and 2 contained the large number of coarse particles as measured using an in-liquid particle counter, revealing that when an $Si_3N_4$ substrate was polished using the slurry as a polishing composition, defects on a surface of a polished object to be polished were increased.

[Polishing Speed]

The inorganic particle-containing slurries obtained in Example 1, Examples 6 to 13, Comparative Example 1, and Reference Example 1 above were directly used as polishing compositions to polish (CMP) $Si_3N_4$ substrates under the same conditions as the conditions described in the above article (Polishing apparatus and polishing conditions). The polishing speed for $Si_3N_4$ substrates was found by dividing a difference in thickness (A) of the $Si_3N_4$ substrate, which was the difference between the thickness before polishing and the thickness after polishing as measured using a light interference type film thickness measurement apparatus (manufactured by Filmetrics Japan, Inc.: model Filmetrics F50), by the polishing time (min).

[Storage Stability]

The average secondary particle size (D50) of inorganic particles in each of the polishing compositions of Examples 1 to 13 and Comparative Examples 1 and 2 was measured at room temperature (25° C.) by a dynamic light scattering method using a particle size distribution measuring system (Nanotrac UPA-UT151, manufactured by MicrotracBEL Corporation). Specifically, through analysis using a measuring device, the particle diameter D50 (nm) when the accumulated volume of particles from the particulate side reaches 50% of the total volume of all the particles in the particle size distribution of inorganic particles was calculated, and then the result was determined to be the average secondary particle size ($D50_A$) (nm) of inorganic particles.

Separately, 100 g of each polishing composition was weighed in a polyethylene bottle. Next, each polyethylene bottle was placed in a thermostatic bath at 80° C. and left to stand for 2 weeks. After left to stand for the predetermined time period, the average secondary particle size ($D50_B$) (nm) of inorganic particles in each polishing composition was measured in the same manner as described above.

Based on the average secondary particle size of inorganic particles before and the same after ($D50_A$(nm) and $D50_B$ (nm)) these compositions were left to stand, the rate of increase (%) of the average secondary particle size was calculated according to the following formula, and then the calculation result was used as an indicator of storage stability. The lower absolute value of storage stability (%) (the rate of increase of the average secondary particle size) indicates the better storage stability. The acceptable absolute value of storage stability (the rate of increase of the average secondary particle size) (%) is 60% or less, preferably 35% or less, more preferably 30% or less, further preferably less than 10%, and particularly preferably less than 5%.

$$\text{Storage stability (\%)} = \frac{D50_B(\text{nm}) - D50_A(\text{nm})}{D50_A(\text{nm})} \times 100 \qquad \text{[Formula 2]}$$

The results of evaluating polishing speed and storage stability are shown in Table 3 below.

[Table 3]

TABLE 3

| | Polishing speed (Å/min) | Storage stability |
|---|---|---|
| Example 1 | 282 | +31% |
| Example 2 | — | +36% |
| Example 3 | — | +25% |
| Example 4 | — | +30% |
| Example 5 | — | +56% |
| Example 6 | 277 | +32% |
| Example 7 | 279 | +28% |
| Example 8 | 273 | +20% |
| Example 9 | 269 | +3% |
| Example 10 | 275 | +0% |
| Example 11 | 278 | +0% |
| Example 12 | 264 | +1% |
| Example 13 | 282 | +2% |
| Comparative example 1 | 265 | +85% |
| Comparative example 2 | — | +104% |
| Reference example 1 | 12 | — |

As is clear from Table 3 above, it was revealed that $Si_3N_4$ substrates can be polished rapidly using the polishing compositions of Examples. Furthermore, it was revealed that the polishing compositions of Examples 9 to 13 are particularly excellent in storage stability.

The present application is based on the Japanese patent application No. 2022-053322 filed on Mar. 29, 2022 and the Japanese patent application No. 2022-145043 filed on Sep. 13, 2022, and the disclosed contents thereof are incorporated herein by reference in their entirety.

What is claimed is:

1. A method for producing an inorganic particle-containing slurry, comprising the steps of:

preparing an inorganic particle dispersion containing an inorganic particle and a dispersing medium, and having a pH less than the isoelectric point of the inorganic particle; and adding an alkaline compound to the inorganic particle dispersion in such a manner that the pH does not reach the isoelectric point of the inorganic particle to obtain the inorganic particle-containing slurry having a pH in the range of 3.0 or more and less than 6.0, wherein the inorganic particle-containing slurry comprises a sugar alcohol.

2. The method according to claim 1, wherein the inorganic particle is at least one selected from the group consisting of silica particle, zirconia particle, alumina particle, ceria particle, titania particle, and silicon carbide particle.

3. The method according to claim 1, wherein the alkaline compound is at least one selected from the group consisting of alkylamine oxide, ammonia, quaternary ammonium salt, hydroxide of alkali metal, carbonate, nitrogen-containing heterocyclic compound, and basic amino acid.

4. The method according to claim 1, wherein the concentration of the inorganic particle in the inorganic particle dispersion is 5 mass % or less.

5. The method according to claim 1, further comprising a step of filtering a mixture obtained in the step of adding the alkaline compound after the step of adding the alkaline compound.

6. The method according to claim 1, wherein the inorganic particle dispersion has a pH of 4.3 or less.

7. The method according to claim 1, wherein the inorganic particle is zirconia particles.

8. The method according to claim 1, wherein a number of the inorganic particles having a particle size of 1.01 μm or more as measured with an in-liquid particle counter included in the inorganic particle-containing slurry is 10,000 particles/mL or less.

9. The method according to claim 1, wherein a number of the inorganic particles having a particle size of 1.98 μm or more as measured with an in-liquid particle counter included in the inorganic particle-containing slurry is 3,000 particles/mL or less.

10. The method according to claim 1, wherein a number of the inorganic particles having a particle size of 3.03 μm or more as measured with an in-liquid particle counter included in the inorganic particle-containing slurry is 1,000 particles/mL or less.

11. The method according to claim 1, wherein the inorganic particle-containing slurry further comprises an inorganic acid or an organic acid, as a pH adjusting agent.

* * * * *